(12) United States Patent
Dayvdov et al.

(10) Patent No.: US 10,924,163 B2
(45) Date of Patent: Feb. 16, 2021

(54) CODEBOOK SUBSET RESTRICTION FOR CSI

(71) Applicant: Apple Inc., Cupertino, CA (US)

(72) Inventors: Alexei Dayvdov, Nizhny Novgorod (RU); Gregory V. Morozov, Nizhny Novgorod (RU); Yushu Zhang, Beijing (CN); Victor Sergeev, Nizhny Novgorod Oblast (RU); Wook Bong Lee, San Jose, CA (US); Dmitry Dikarev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/609,294

(22) PCT Filed: Jun. 4, 2018

(86) PCT No.: PCT/US2018/035845
§ 371 (c)(1),
(2) Date: Oct. 29, 2019

(87) PCT Pub. No.: WO2018/226581
PCT Pub. Date: Dec. 13, 2018

(65) Prior Publication Data
US 2020/0186207 A1    Jun. 11, 2020

Related U.S. Application Data

(60) Provisional application No. 62/515,976, filed on Jun. 6, 2017, provisional application No. 62/530,539, filed
(Continued)

(51) Int. Cl.
*H04B 7/06* (2006.01)
*H04B 7/0417* (2017.01)
(Continued)

(52) U.S. Cl.
CPC ......... *H04B 7/0417* (2013.01); *H04B 7/0426* (2013.01); *H04B 7/0469* (2013.01); *H04B 7/0626* (2013.01); *H04B 7/0634* (2013.01)

(58) Field of Classification Search
CPC .. H04B 7/0417; H04B 7/0426; H04B 7/0469; H04B 7/0626; H04B 7/0634;
(Continued)

(56) References Cited

U.S. PATENT DOCUMENTS

2015/0207552 A1*  7/2015  Nammi ............... H04B 7/0645
                                                    370/281
2016/0353290 A1* 12/2016  Nammi ............... H04B 7/0482
(Continued)

FOREIGN PATENT DOCUMENTS

EP         2437408 A1    4/2012

OTHER PUBLICATIONS

International Search Report dated Sep. 11, 2018 for International Application No. PCT/US2018/035845.
(Continued)

*Primary Examiner* — Kenneth T Lam
(74) *Attorney, Agent, or Firm* — Eschweiler & Potashnik, LLC

(57) ABSTRACT

Network devices and systems in 5G advance long term evolution (LTE) and new radio (NR) infrastructures utilize beam management operations to ensure communications for channel state information (CSI) reporting by a user equipment (UE). CSI report configuration reporting settings are processed based on a codebook subset restriction to indicate pre-coding matrix indicators (PMIs) that are restricted and non-restricted for PMI reporting associated with a rank indicator (RI). Based on the codebook subset restriction, an
(Continued)

advanced CSI codebook or a new radio (NR) codebook is generated to be transmitted on non-restricted beams of the codebook subset restriction.

23 Claims, 13 Drawing Sheets

Related U.S. Application Data on Jul. 10, 2017, provisional application No. 62/544,249, filed on Aug. 11, 2017, provisional application No. 62/556,962, filed on Sep. 11, 2017, provisional application No. 62/567,174, filed on Oct. 2, 2017.

(51) Int. Cl.
*H04B 7/0426* (2017.01)
*H04B 7/0456* (2017.01)

(58) Field of Classification Search
CPC .. H04B 7/0478; H04B 7/0486; H04B 7/0639; H04B 7/0658
See application file for complete search history.

(56) References Cited

U.S. PATENT DOCUMENTS

| | | | |
|---|---|---|---|
| 2018/0034612 A1* | 2/2018 | Lin | H04B 7/0626 |
| 2018/0049047 A1* | 2/2018 | Lin | H04W 24/02 |
| 2018/0145737 A1* | 5/2018 | Rahman | H04B 7/0634 |
| 2018/0367196 A1* | 12/2018 | Nammi | H04B 7/0639 |
| 2019/0068256 A1* | 2/2019 | Muruganathan | H04B 7/0478 |

OTHER PUBLICATIONS

"FD-MIMO codebook structure, design features, and dimensioning." Source: Ericsson. Agenda Item: 7.2.5.3.1. 3GPP TSG-RAN WG1#82, Beijing, China, Aug. 24-28, 2015. R1-154557.
"Discussion on Codebook Subset Restriction in Advanced CSI." Source: Huawei, HiSilicon. Agenda item: 6.1.4. 3GPP TSG RAN WG1 Meeting #89, Hangzhou, China May 15-19, 2017. R1-1708194.
International Preliminary Report on Patentability dated Dec. 10, 2019 for International Application No. PCT/US2018/035845.

* cited by examiner

CODEBOOK SUBSET RESTRICTION FOR CSI

REFERENCE TO RELATED APPLICATIONS

This application is a National Phase entry application of International Patent Application No. PCT/US2018/035845 filed Jun. 4, 2018, which claims priority to U.S. Provisional Application Nos. 62/515,976 filed Jun. 6, 2017, entitled "CODEBOOK SUBSET RESTRICTION FOR ADVANCED CSI", the benefit of U.S. Provisional Application No. 62/530,539 filed Jul. 10, 2017, entitled "CODEBOOK SUBSET RESTRICTION FOR HYBRID CHANNEL STATE INFORMATION", the benefit of U.S. Provisional Application No. 62/544,249 filed Aug. 11, 2017, entitled "CODEBOOK SUBSET RESTRICTION FOR NEW RADIO (NR)", the benefit of U.S. Provisional Application No. 62/556,962 filed Sep. 11, 2017, entitled "CODEBOOK SUBSET RESTRICTION FOR NEW RADIO", and the benefit of U.S. Provisional Application No. 62/567,174 filed Oct. 2, 2017, entitled "METHOD OF CODEBOOK SUBSET RESTRICTION", incorporated by reference in their entirety.

FIELD

The present disclosure relates to wireless technology, and more specifically to techniques for beamforming systems based on codebook restriction for channel state information (CSI), and more particularly, codebook subset restriction.

BACKGROUND

The explosive wireless traffic growth leads to an urgent need of rate improvement. With mature physical layer techniques, further improvement in the spectral efficiency could be marginal. On the other hand, the scarcity of licensed spectrum in low frequency band results in a deficit in the data rate boost. The next generation wireless communication system, 5G, will provide access to information and sharing of data anywhere, anytime by various users and applications. 5G is expected to be a unified network/system that target to meet vastly different and sometime conflicting performance dimensions and services. Such diverse multi-dimensional requirements are driven by different services and applications. In general, 5G could evolve based on 3GPP long term evolution (LTE) advanced (LTE-Adv) with additional potential new Radio Access Technologies (RATs) to enrich people lives with better, simple and seamless wireless connectivity solutions. 5G will enable many devices to be connected by wireless communications and deliver fast, rich contents and services Similar to LTE, multiple antenna techniques can be a key technology component in 3GPP 5G new radio (NR) systems. Specifically, beamforming with very narrow beam width, leading to high beamforming gain, can be an important tool for high frequency NR to achieve target coverage. To operate in a wide frequency range from below 6 GHz to 100 GHz, for example, 3GPP NR aims to provide a unified approach to realize single and multi-beam transmission. Multiple antennas can also be implemented at a transmitting device such as a Transmission Reception Point (TRP) (e.g., eNodeB (eNB)/Next Generation NodeB (gNB)/base station antenna panel) and the user equipment (UE), and are referred to as multiple-input, multiple-output (MIMO) devices. MIMO technology is the use of multiple antennas or antenna arrays/panels at one or more transmitters (Tx) and one or more receivers (Rx). A MIMO system can be used to increase data throughput and link reliability of a network without increasing bandwidth frequencies or increasing transmit power of the network. To achieve this, the data communicated between a node (eNB/gNB) and a mobile device (e.g., UE) can be spread over the multiple antennas to achieve an array gain that improves a spectral efficiency and achieves a diversity gain. Massive MIMOs can deploy a large number of antenna elements in antenna arrays. Multiple terminals can be deployed for combining a massive MIMO technology with conventional time and frequency division multiplexing using orthogonal frequency division multiplexing (OFDM).

Three-dimensional (3D) or full-dimensional (FD) MIMO systems can be used in MIMO networks to enhance the cellular performance by deploying antenna elements in both horizontal and vertical dimensions, e.g. a two dimensional (2D) antenna array. A FD MIMO system can direct communications in two dimensions, i.e. horizontally and vertically, to a location in three dimensional (3D) space. The direction of communications in 3D space can increase the directionality, allowing for increased numbers of communication paths, more focused beamforming, and increased throughput for spatial multiplexing in comparison with traditional two dimensional MIMO systems.

DETAILED DESCRIPTION

Figure 1:
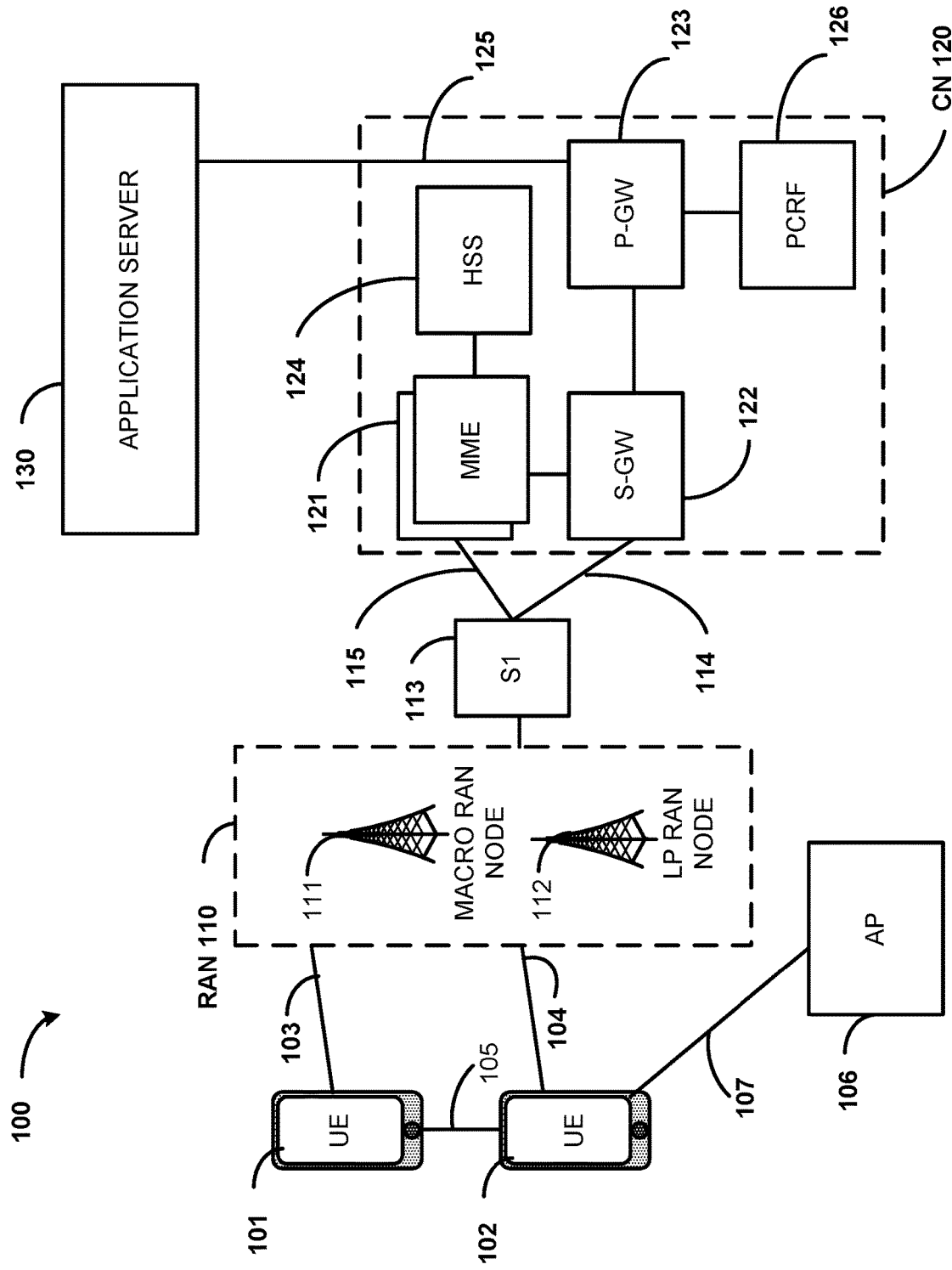
FIG. 1 is a block diagram illustrating an example network system with a UE, and eNB/gNB in a core network useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Overview

In consideration of the above, various aspects/embodiments are disclosed for communications in a beamforming system or beamforming network device (e.g., user equipment (UE), evolved NodeB (eNB), a next generation NodeB (gNB), new radio (NR) base station (BS), a multi-input multi-output (MIMO) device, single-input multi-output (SIMO) device, or the like). In particular, with respect to LTE advanced and 5G NR devices, issues related to performance (power efficiency, beamforming, channel quality, etc.) can arise for beam management procedures, including beam reporting for channel state information (CSI) about the downlink channel observed by the Rx can be improved. For example, when the UE rotates or is blocked, the current Rx beam for downlink (DL) and Tx beam for UL will not necessarily operate as expected due to interference or a low quality channel.

CSI can be obtained by the Tx from the Rx: a) from estimation of the uplink channel, and by using channel reciprocity of the wireless channel; and b) from quantized feedback measured by the Rx. The quantized form of CSI feedback can be used for both frequency division duplex (FDD) and time division duplex (TDD) operational systems. Quantized CSI (or referred to as CSI) includes the precoding matrix index (PMI) to assist beamforming or precoding selection at the Tx antennas of the gNB. The set (or group) of possible PMIs is denoted as a codebook. To different possible deployments of the 5G New Radio (NR) system, a codebook is designed and configured to provide reasonable performance in all possible serving directions of the gNB. However, depending on the actual deployment of the gNB, the usage of some PMIs in such codebook should be avoided. For example, considering the interference that may be created to the neighboring cells, some of the PMI vectors result in a higher interference in the downlink channel with respect to other PMIs or PMI vectors. To avoid CSI reporting corresponding to such PMIs that are higher interfering than other vectors, a codebook subset restriction can be defined as a parameter in the consideration of beamforming with a bitmap, and utilized by the UE for CSI feedback.

In some aspects herein, a codebook subset restriction design for Type I single-panel operations can be generated/processed/configured by a single codebook subset restriction bitmap for all ranks; along with operations to link each DFT vector with one or more beamforming vectors with different structures.

In other aspects, a codebook subset restriction can be configured for Type II with two different bitmaps: a first for restriction of two dimensional (2D) discrete Fourier transform (DFT) vector with higher power, and a second for restriction of 2D DFT vector with low power, with respect to one another.

Additionally, or alternatively, codebook subset restriction is configured for Type I multi-panel, such as with a single bitmap for restriction of beamforming vectors, considering 2D DFT beam and inter-panel co-phasing. The advantages of these aspects can be seen in NR, as well as in advanced LTE codebooks. For example, these aspects enable applying a single codebook subset restriction bitmap for all the rank values for Type I single-panel, a more sufficient level of flexibility for Type II codebook subset restriction and more sufficient level of flexibility for Type I multi-panel codebook subset restriction.

In other aspects related to codebook subset restriction, CSI signaling operations are configured to indicate a maximum possible value of a rank for rank restriction, restricting the rank of the PMIs, the PMIs, or other beam forming parameters. For example, a codebook subset restriction can be defined for rank 3-8 codebooks using configurations with Type II codebooks (with non-precoded/pre-coded channel state information reference signals (CSI-RS) as defined/described in TS 38.214). Further, the bitmap defined for codebook subset restriction of ranks 1-2 Type II codebooks can be reused or utilized also for rank 3-8 codebooks. Here, advantages include a reduced number of bits required for signaling of codebook subset restriction configuration.

In further aspects, codebook subset restrictions can be configured for hybrid CSI or advanced CSI with respect to MIMO types. For example, signaling of a codebook subset restriction can correspond specifically for a first enhanced MIMO (eMIMO) type and a second eMIMO type. The first eMIMO type can be a Class B full dimensional (FD) MIMO with K greater than 1, or a Class A FD-MIMO, in which K is a number of bitmaps. Each K-th CSI-RS resource with a structure according to a table or a bitmap indicating a DFT beam restriction. Additionally, the second eMIMO type can correspond to a Class B F-MIMO with K being equal to one.

Other aspects include controlling beamforming selection at the UE for CSI reporting by restricting certain undesired beam directions, as with a codebook subset restriction, by defining two bitmaps. Each of the two bitmaps can indicate a set of restricted beams for a pre-coding matrix, and correspond to a strong and weak beams with respect to one another.

Additional aspects and details of the disclosure are further described below with reference to figures.

Embodiments described herein can be implemented into a system using any suitably configured hardware and/or software. FIG. 1 illustrates an architecture of a system 100 of a network in accordance with embodiments/aspects herein. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

Any of the UEs 101 and 102 can alternatively, or additionally, comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

The UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some examples, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

The CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). The P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In aspects, the UEs 101, 102 and RAN 110 with RAN nodes 111, 112 can operate as MIMO devices enabling CSI feedback to be communicated there-between. CSI feedback can be utilized for systems with multiple antennas at the transmitter of the base station, eNB or gNB 111/112 with multiple antennas or multiple antenna ports in order to effectively use the transmission down link channel state information. The UE 101, for example, measures the channel from reference signals from multiple antennas and then compresses/quantizes the information as CSI feedback. The UE 101 then transmits feedback to the base station 111/112, where it derived information from the CSI feedback for generating the transmission by beamforming to focus the power to the UE direction. CSI feedback is comprised of three components: Rank Indicator (RI), Precoder Matrix Indicator (PMI), and Channel Quality Indicator (CQI). In particular, RI indicates the rank of the matrix of the precoder matrix used for transmission; this indicates how many special layers are preferred for transmission, or how many simultaneous data streams the UE 101/102 can process/receive. PMI indicates which particular matrix that the base station should apply for the transmission at the antenna port.

However, the UE can be in such a location that the transmission to that location can be harmful for system/network performance. Thus, the base station should help somehow restrict some directions to UE, in which each base station would not transmit to optimize the performance. This indication is called a codebook subset restriction because the codebook is that structure used to indicate a particular precoding matrix. The available precoding matrix can be comprised by a codebook, which can also have multiple precoding matrices available for transmission. Because some of these matrices are not optimal for system performance at a given time some of these are restricted via a codebook subset restriction, indicating the PMI being restricted in a dynamic way.

Figure 2:
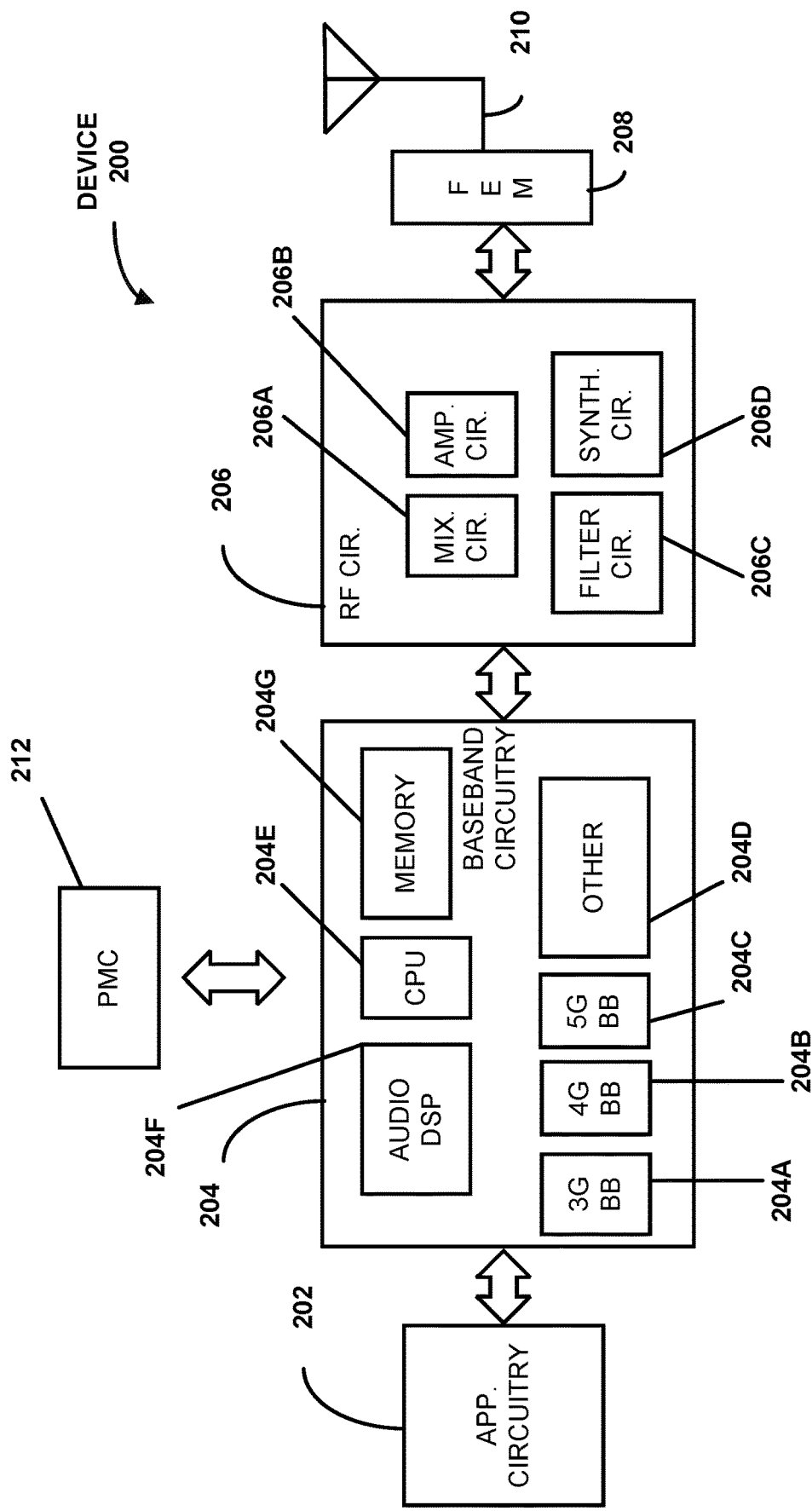
FIG. 2 is a diagram illustrating example components of a network device as a UE or eNB/gNB that can be employed in accordance with various aspects discussed herein.

FIG. 2 illustrates example components of a device 200 in accordance with some embodiments of devices that operate for beamforming via codebook subset restriction(s). In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a gNB, eNB, UE, a RAN node or other network device incorporating one or more various aspects/embodiments herein. In some embodiments, the device 200 can include less elements (e.g., a RAN node could not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc.

to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
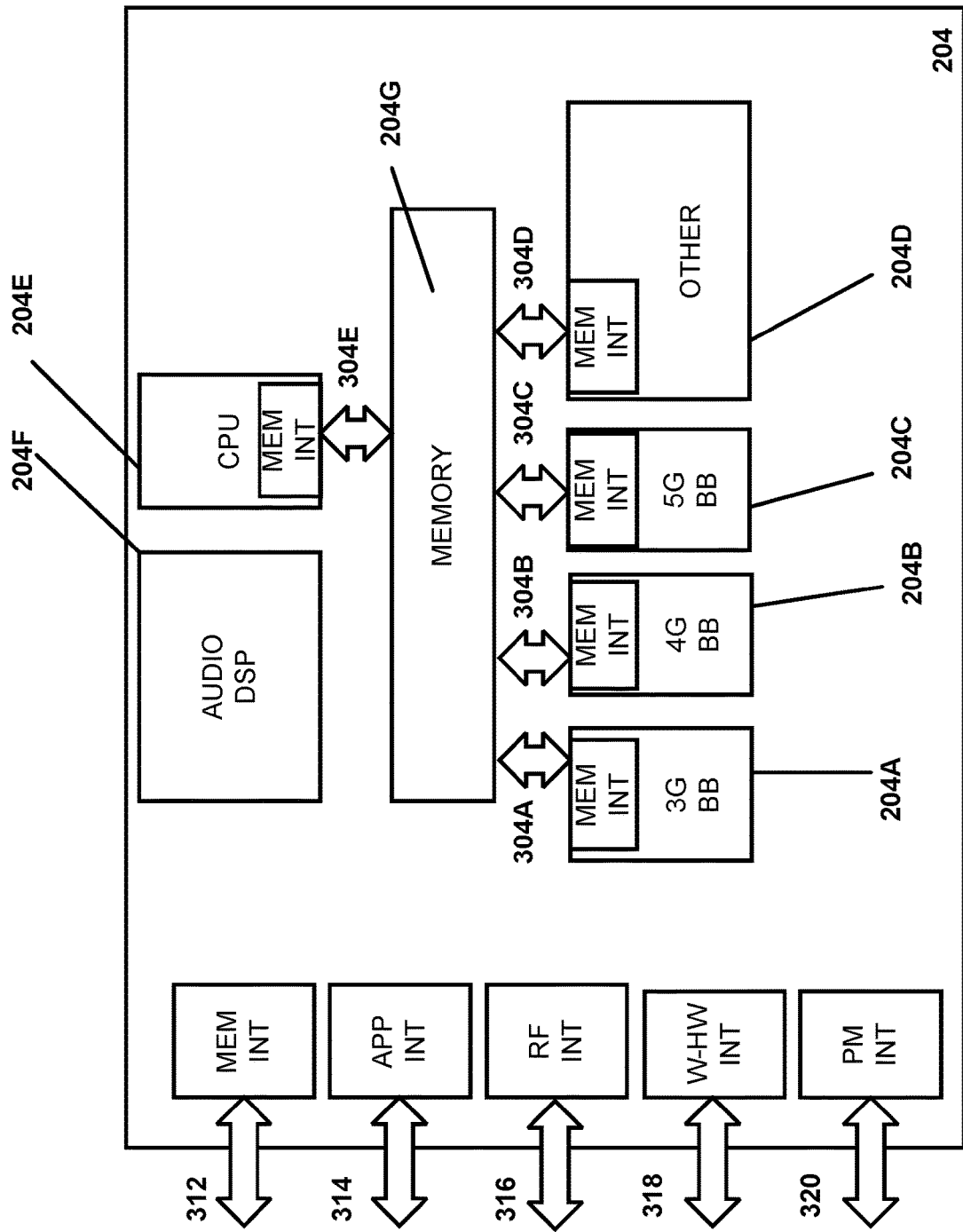
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
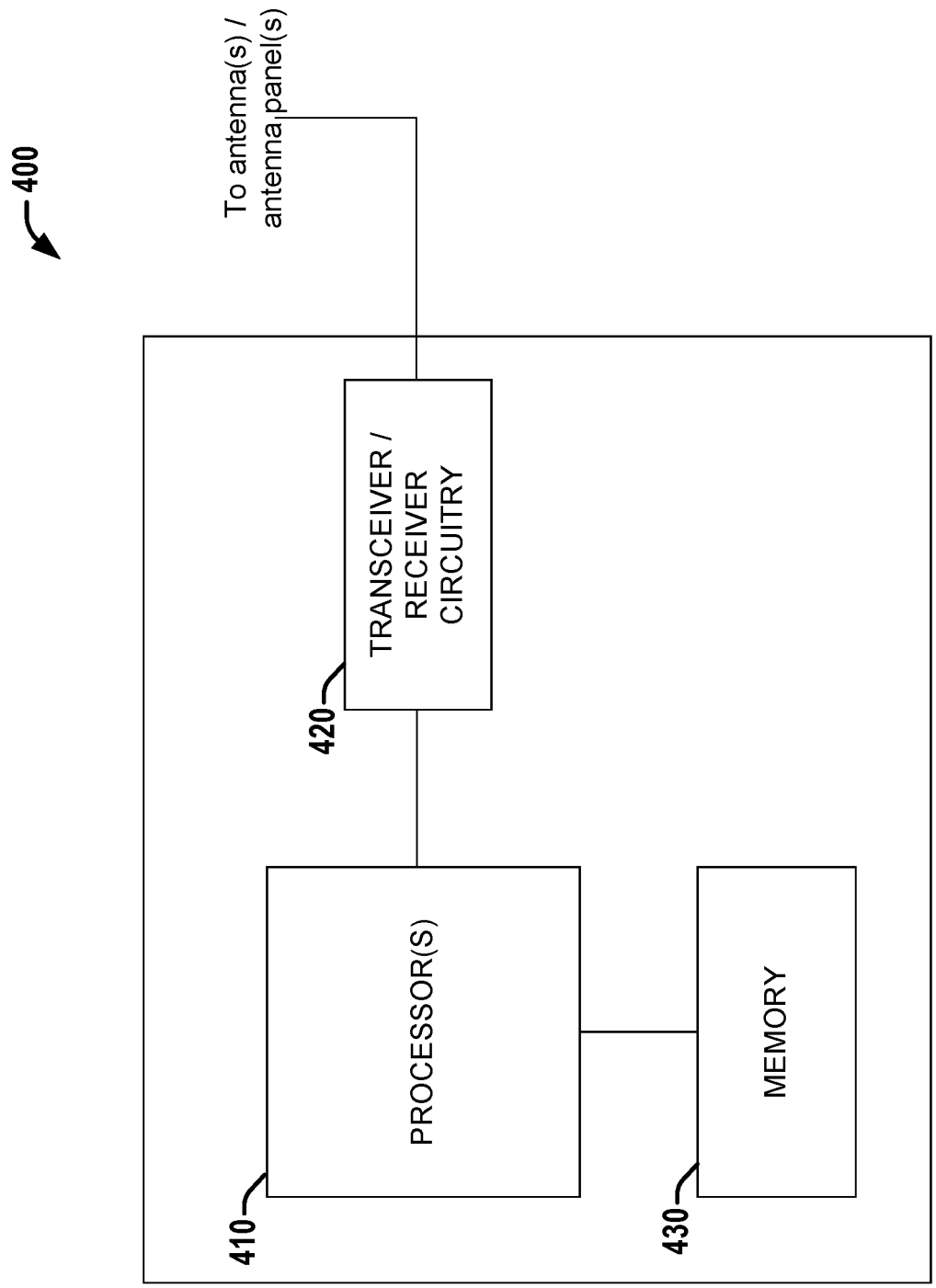
FIG. 4 is a block diagram illustrating a system employable at a UE that enables beam reporting and beam forming operations, according to various aspects described herein.

Referring to FIG. 4, illustrated is a block diagram of a system 400 employable at a UE (User Equipment) that facilitates or enables greater power efficiency beam management and CSI feedback for transmissions, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE), for example, a MTC UE. As described in greater detail below, system 400 can facilitate greater power efficiency for beam management operations, including CSI reporting/feedback based on codebook subset restriction.

Figure 5:
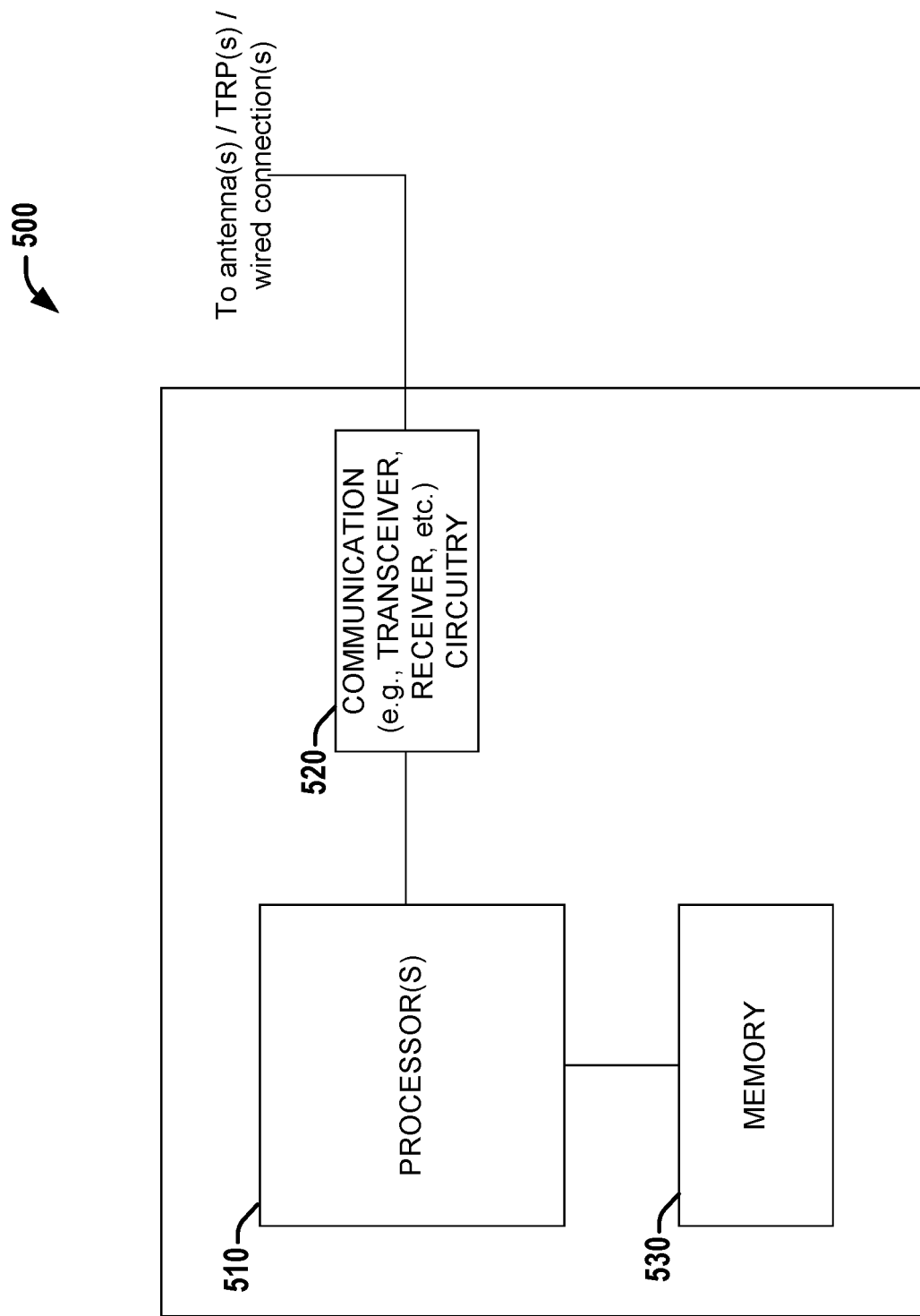
FIG. 5 is a block diagram illustrating a system employable at a base station (BS)/evolved NodeB (eNB)/new radio/next generation NodeB (gNB) that enables beam reporting and beam forming operations, according to various aspects described herein.

Referring to FIG. 5, illustrated is a block diagram of a system 500 employable at a BS (Base Station), gNB, eNB or other network device/component that facilitates enables beam forming and CSI reporting, according to various aspects described herein. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system/device 500 can enable beam management and delivery based on codebook subset restriction.

FD-MIMO Codebook Structure and Codebook Subset Restriction:

The configuration of structure for PMIs contained in LTE-A FD-MIMO codebooks are represented below for rank 1 codebook (1) and rank 2 codebook (2):

$$W^{(1)}_{l,m,n} = \frac{1}{\sqrt{P}} \begin{bmatrix} v_{l,m} \\ \varphi_n v_{l,m} \end{bmatrix} \quad (1)$$

$$W^{(2)}_{l,l',m,n',n} = \frac{1}{\sqrt{2P}} \begin{bmatrix} v_{l,m} & v_{l',m'} \\ \varphi_n v_{l,m} & -\varphi_n v_{l',m'} \end{bmatrix} \quad (2)$$

$$\varphi_n = e^{j\pi n/2} \quad (3)$$

$$u_m = \begin{bmatrix} 1 & e^{j\frac{2\pi n}{O_2 N_2}} & \dots & e^{j\frac{2\pi n(N_2-1)}{O_2 N_2}} \end{bmatrix}$$

$$v_{l,n} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T,$$

$W_{l, m, n}$ represents a precoding matrix of rank 1 (RI=1) in equation 1, and rank 2 in equation 2, where the indices (e.g., l, m or others)) represent different dimensional directions in space. P represents a number of cell specific reference signal (CSR) ports utilized by gNB 111, for example. Vector $v_{l,m}$ can be a 2D DFT vector, where indexes/and m represent/determine the direction of the transmission; they vary in the following ranges: l=0, 1, . . . (N1O1−1), m=0, 1, . . . (N2O2−1). Thus, for the case of FD-MIMO, bitmap A for codebook subset restriction can be designed in the following way: bit $a_{l,m}$ of the bitmap is associated with one value of (l, m), the bitmap size is N1N2O1O2 bits to cover all possible values of (l,m). If bit $a_{l,m}$ corresponding to (l, m) is set to zero, then reporting of PMI that comprise of $v_{l,m}$ is restricted for any rank. N1 and N2 represent the number of antennas (of an antenna array), and O1 and O2 represent the vector that indicates the granularity of the beams of an antenna array. Thus, if O1 is equal to 1, only N1 DFT beams are in this dimension; however, if O1 increases, for example, O1 equals to 2, then a total of N1O1 beams are in this dimension. N1O1 can also be represented as N1(O1), N1×O1, or the like, for example, such that the bitmap size is a multiple of the beams and the granularity for the bitmap size. For example, N1N2O1O2 can also be represented as N1×N2×O1×O2.

In NR for such design of beams of codebooks, a specific codebook subset restriction can be introduced to indicate which particular pre-coders are restricted for feedback and for this purpose the bitmap is generated or configured by the UE based on CSI report configuration reporting settings, or information provided to the UE 101/1 102 by the gNB 111/112 for the CSI feedback. The size of bitmap is N1N2O1O2, so it covers all the beams in the codebooks, where for each particular beam a specific bit indicates if this corresponding beam is restricted or not for CSI feedback. Thus, if the corresponding beam equals to 0 the beam is restricted, UE 101/102 cannot transmit the feedback with such beam and so it has to choose different beams for feedback than the ones restricted. In some embodiments, various configurations of the bits can be used for indicating a restriction. For example, out of two or more bits (e.g., 3 bits), if one of the bits is set to zero, then all beam vectors with this indices can be restricted for transmission. Likewise, other configurations can also be enabled, so that less than all beams with the indicated restriction are restricted, or other bit configurations are utilized as one of ordinary skill in the art could appreciate.

For NR transmissions, or LTE advanced transmissions, the design of codebooks can be similar. Communication operations are optimized for the antennas with two polarizations with cross-pole antennas and for a uniform planner array. They use these Tx beams and this $V_{l,m}$ as the transmit beam being a vector with linear phase, in which the/and m indices can also indicate the phase ramp within a two dimension of antennas, indicating the direction of the transmission.

The phi $\varphi_n$ of equation 2 indicates the coefficient between two polarizations. Because two polarizations exists in the configured equations, the devices can correlate the vectors with this coefficient to ramp transmission. The minus sign indicates the orthogonality of the coefficient vector dimension of the precoder matrix. This demonstrates an example configuration of the DFT vector, essentially a product between two vectors for the linear phase ramp across n (e.g., two) dimensions of an antenna, across, for example, horizontal and vertical dimension. U represents a linear phase ramp across two dimensions and the bottom-most equation represents the linear phase ramp extended across a third dimension.

In one embodiment for NR, codebooks for rank 3 and 4 for the specific number of antennas of CSR ports (e.g., g 16, 24, and 32 antenna ports) can be configured by a different specific design that varies from the common frameworks. In particular, the gNB 111/112 can generate an NR Type I single-panel codebook. For NR, Type I single-panel codebooks are configured as FD-MIMO LTE-A codebooks. PMI for Type I single-panel rank 1 and 2 codebooks follow equations (1, 2). However, an exception can be generated for the following: rank 3 and rank 4 codebooks for 16, 24 and 32 antenna ports at the gNB 111/112 by using a different PMI structure (4). Such PMI structure can be referred to as an antenna grouping and be configured based on an antenna grouping parameter.

$$W^{(4)}_{g,r,k,n} = \frac{1}{\sqrt{4P}} \begin{bmatrix} b_{g,r} & b_{g,r} & b_{g,r} & b_{g,r} \\ c_k b_{g,r} & -c_k b_{g,r} & c_k b_{g,r} & -c_k b_{g,r} \\ \varphi_n b_{g,r} & \varphi_n b_{g,r} & -\varphi_n b_{g,r} & -\varphi_n b_{g,r} \\ c_k \varphi_n b_{g,r} & -c_k \varphi_n b_{g,r} & -c_k \varphi_n b_{g,r} & c_k \varphi_n b_{g,r} \end{bmatrix}, \quad (4)$$

$$b_{g,r} = \begin{bmatrix} u_r & e^{j\frac{2\pi g}{O_1(N_1/2)}} u_r & \cdots & e^{j\frac{2\pi g((N_1/2)-1)}{O_1(N_1/2)}} u_r \end{bmatrix}^T, \quad (5)$$

Above, equation 4 is an example configuration design of antenna grouping for codebooks for rank 3 and 4 for particular numbers (e.g., 16, 24 and 32) of antenna ports for these specific antenna groupings, where b represents the DFT beam used for codebooks but with the dimension divided by a fraction (e.g., divided by two or halved), which also indicates being in the third dimension; in particular, where N1 is divided by two and this is the equivalent that like the antenna array is divided by two arrays in a third dimension. So a half of antennas in the array are used to form beamforming to form a beam and use coefficients for the different parts of antenna to form different beams. These beamforming vectors corresponds to some direction. There is not a clear correspondence with the indices L (or l) and M (or m) above, but the indices here corresponds to specific direction as a combination of indices g, r and k of different directions, which indicates the coefficient (C or c) between antenna groups with a slightly bit different direction of each beam within a particular antenna grouping from among different groups of antennas, for example.

Each antenna grouping can be closer together than in other groups of antennas, for example. As such, basically the operation for beamforming is to divide the antennas into different groups (e.g., two groups) and use coefficients that correlate the two groups between one another, in which two layers are orthogonal because of orthogonal coefficients between the antenna groups.

In one embodiment, for the purpose of codebook subset restriction the UE 101/102 is configured with a bitmap (e.g., bitmap A) by higher layer signaling. Each bit $a_{l,m}$ within bitmap A corresponds to 2D DFT vectors $v_{l,m}$ (eqn. 3). Each PMI within a codebook comprises one or more 2D DFT vectors (see eqns. 1, 2), except the case of rank 3 and rank 4 codebooks for 16, 24, 32 antenna ports at the gNB. If bit $a_{l,m}$ is set to zero, then PMI that is comprised from $v_{l,m}$ is restricted for reporting with corresponding indices.

Beamforming vector, which determines direction of the transmission, for NR rank 3, 4 codebooks for 16, 24, 32 antenna ports at the gNB can be defined as follows: $h_{g,r,k} = [b_{g,r}^T \ c_k \cdot b_{g,r}^T]$ (see eqns. 4, 5).

In order to simplify description, set of indexes (l, m) is denoted as index K, set of indexes (g, r, k) in three dimensions is denoted as index J.

To link 2D DFT vector $v_K$ and beamforming vector $h_J$ a specific procedure is defined. As the result of that procedure each index K is linked with set {J1, J2, ..., JN}. If $a_K$ is set to zero, then PMI that comprise of at least one vector from the set $\{h_{J1}, h_{J2}, \ldots, h_{JN}\}$ is restricted for CSI reporting.

In one embodiment, the procedure to link 2D DFT vector $v_K$ and beamforming vector $h_J$ is as follows: 1. Value of $Z_{K,J}$ is calculated $Z_{K,J} = f(v_K, h_J)$; and, 2. If the value of $Z_{K,J}$ exceeds specified value T, K is considered linked with J.

In one embodiment $Z_{K,J} = |v_K^H \cdot h_J|$, where H denotes Hermitian transpose operator. In another embodiment $Z_{K,J} = -\text{sum}(|v_K - h_J|^2)$, where sum(•) is an operator that calculates sum of vector elements.

In one embodiment threshold T is defined as $T = v_{l,m}^H \cdot v_{l+1,m}$. In another embodiment threshold T is defined as $T = -\text{sum}(|v_{l,m} - v_{l+1,m}|^2)$.

In other embodiments, bitmap A is used for codebook subset restriction for rank 3, 4 codebooks for 16, 24, 32 antenna ports at the gNB in the following way: if bit $a_{l,m}$ is set to zero (where l is even), then the PMI comprised from $b_{l/2,m}$ is restricted for reporting regardless of value of index k. In this embodiment, value of bit $a_{l,m}$ with odd index l does not impact codebook subset restriction for rank 3, 4 codebooks for 16, 24, 32 antenna ports at the gNB.

In other embodiments, bitmap A is used for codebook subset restriction for rank 3, 4 codebooks for 16, 24, 32 antenna ports at the gNB in the following way. Bits $a_{mod(l-1,N1 \cdot O1),m}$; $a_{l,m}$; $a_{mod(l+1,N1 \cdot O1),m}$ are linked with beamforming vectors $[b_{l/2,m} \ c_k \cdot b_{l/2,m}]$, k=0, 1, 2, 3, in one example they are linked by the using one of the below tables. The following auxiliary variables are defined for simplicity: $q_0 = \text{mod}(\text{mod}(l,8), 4)$; $q_2 = \text{mod}(\text{mod}(l,8)+1, 4)$; $q_3 = \text{mod}(\text{mod}(l,8)+2, 4)$; $q_4 = \text{mod}(\text{mod}(l,8)+3, 4)$. One beam forming vector can be configured for the rank 3 or 4 codebooks for the specific number of ports, the direction of transmission for such vector, for example here $b_{l/2,m}$ and $c_K b_{l/2,m}$, and the direction of this vector are connected to 3 vectors from a DFT codebook, from different codebooks, in which the indices of these codebooks can be represented as mod (l−1, N1O1) and corresponds to a particular beamforming vector. Another DFT beam can be represented by the indices of another DFT beam which corresponds to another beamforming vector, which is m, and the $3^{rd}$ vector is mod L+1, N1 multiplied by O1, which demonstrates 3 vectors which have common direction with the beamforming direction from these special codebooks. The idea is the direction of transmission for three DFT vectors are close to the direction of transmission of one special beamforming vector from special codebooks, one based on 3 bits corresponding to this one beamforming direction too as corresponding to $B_{L/2, m}$ so this DFT vector can be selected for a particular selected antenna group. Thus, different combinations of bits for these three DFT vectors can be used by the gNB 111/112 to make a decision of whether to restrict a certain precoder from a special codebook or not.

In an aspect agreed to was that if at least one bit, from these three bits, is zero, then all the co-phasing vectors are restricted. So then this vector $B_{L/2, m}$ is restricted based on 3 bits if any of the 3 bits is equal to 0, then B vector is restricted with corresponding indices. As such, the directions that are mostly common between these three and this one bit. So if at least one corresponding bit of the three is zero, at least one corresponding bit is zero then the gNB 111/112 can restrict the particular B vector and co-phasing vector as any of the possible related values.

TABLE 1

One example for codebook subset restriction for rank 3, 4 codebooks for 16, 24, 32 antenna ports at the gNB:

| $a_{mod(l-1,N1 \cdot O1),m}$ | $a_{l,m}$ | $a_{mod(l+1,N1 \cdot O1),m}$ | Restricted values of k | Not restricted values of k |
|---|---|---|---|---|
| 0 | 0 | 0 | 0, 1, 2, 3 | — |
| 0 | 0 | 1 | $q_0, q_1$ | $q_2, q_3$ |
| 0 | 1 | 0 | $q_1, q_3$ | $q_0, q_2$ |
| 0 | 1 | 1 | $q_1$ | $q_0, q_2, q_3$ |
| 1 | 0 | 0 | $q_0, q_3$ | $q_1, q_2$ |
| 1 | 0 | 1 | $q_0$ | $q_1, q_2, q_3$ |
| 1 | 1 | 0 | $q_3$ | $q_0, q_1, q_2$ |
| 1 | 1 | 1 | — | 0, 1, 2, 3 |

TABLE 2

Another example for codebook subset restriction for rank 3, 4 codebooks for 16, 24, 32 antenna ports at the gNB:

| $a_{mod(l-1,N1 \cdot O1),m}$ | $a_{l,m}$ | $a_{mod(l+1,N1 \cdot O1),m}$ | Restricted values of k | Not restricted values of k |
|---|---|---|---|---|
| 0 | 0 | 0 | 0, 1, 2, 3 | — |
| 0 | 0 | 1 | $q_0, q_1, q_2$ | $q_3$ |
| 0 | 1 | 0 | $q_1, q_3, q_2$ | $q_0$ |
| 0 | 1 | 1 | $q_1$ | $q_0, q_2, q_3$ |
| 1 | 0 | 0 | $q_0, q_3, q_2$ | $q_1$ |
| 1 | 0 | 1 | $q_0$ | $q_1, q_2, q_3$ |
| 1 | 1 | 0 | $q_3$ | $q_0, q_1, q_2$ |
| 1 | 1 | 1 | — | 0, 1, 2, 3 |

In other embodiments, bitmap A is used for codebook subset restriction for rank 3, 4 codebooks for 16, 24, 32 antenna ports at the gNB in the following way: Bits $a_{mod(l+1,N1 \cdot O1),m}$; $a_{l,m}$ are linked with beamforming vectors $[b_{l/2,m} c_k \cdot b_{l/2,m}]$ for k=0, 1, 2, 3. In one example if at least one bit $a_{mod(l+1,N1 \cdot O1),m}$, $a_{l,m}$ is set to zero then reporting of codebook subset based on vector $[b_{l/2,m} c_k \cdot b_{l/2,m}]$ is restricted for all possible values of k.

In other embodiment bitmap for restriction of $c_k$ values is configured separately from bitmap A, wherein P of size 4 is used for this purpose. If bit $p_k$ of bitmap P set to zero then reporting of precoder matrixes based on vector $[b_{g,m} c_k \cdot b_{g,m}]$ is restricted.

In other embodiment codebook for rank 3, 4 codebooks for 16, 24, 32 antenna ports at the gNB is not specified. In this case all PMIs in rank 3, 4 codebooks for 16, 24, 32 antenna ports at the gNB is not restricted regardless of bitmap A.

Thus, based on the above an apparatus configured to be employed in the UE 101, 102 or 400, for example, can include a radio frequency (RF) interface configured to process, with RF circuitry, data of a transmission comprising channel state information (CSI) report configuration reporting settings to enable a pre-coding matrix indicator (PMI) feedback (reporting) associated with a rank indicator (RI) feedback, based on a codebook subset restriction associated with at least one of: an advanced CSI codebook or a new radio (NR) codebook. One or more processors, coupled to the RF interface, can determine the PMI feedback associated with the RI feedback based on a bitmap of the codebook subset restriction from the processed transmission, wherein the bitmap comprises an indication of a set of PMIs restricted from the PMI feedback and the RI feedback. The at least one of: the advanced CSI codebook or the NR codebook that is configured with the PMI feedback and the RI feedback can be configured to be transmitted on non-restricted beams of the codebook subset restriction. The transmission can be processed by the gNB 111, 112, or 500 for beam forming based on the codebook(s).

The bitmap can include sets of bits (two or more) corresponding to a plurality of beams in various dimensions, in which one or more bits of each set can indicate a beam or beam vector. The UE 101/102/400 can restrict at least one of: the PMI feedback or the RI feedback, associated with the beam of the plurality of beams, based on a configuration of the one or more bits and transmit the PMI feedback and the RI feedback on the plurality of beams as non-restricted beams other than the restricted beam that is unused in the transmission.

In an aspect, the UE can determine the PMI feedback and the RI feedback with the at least one of: the advanced CSI codebook or the new radio (NR) codebook, based on one or more antenna groupings corresponding to RIs equal to a value of three or four, differently than from one or more other codebooks associated with an RI equal to one or two for non-grouped antenna or other codebooks not based on a grouping of antennas from among different groups. The codebook subset restriction can then corresponding to antennas only within the particular grouping being indicated by the gNB, for example, wherein the antenna groupings comprise a number of antenna ports comprising at least one of: 16, 24 or 32 antenna ports. As discussed above, the one or more bits that restrict the plurality of beams within an antenna group as a subset of antennas of the antenna groupings can comprise one or more dimensions equal to a fraction of the one or more other codebooks.

In an aspect, the UE 101/102/400 can restrict a subset of the at least one of: the advanced CSI codebook or the NR codebook, comprising at least one of: a co-phasing vector or a Discrete Fourier Transform (DFT) beam vector of an associated beam, in response to at least one bit of a set of bits comprising a first configuration (e.g., a zero or otherwise). The UE can operate to generate the transmission on one or more non-restricted beams/beam vectors in response to the set of bits comprising a second configuration (e.g., a one or otherwise) that is different from the first configuration related to these beam vectors.

In an example, the first configuration can include the at least one bit being zero, wherein the set of bits is associated with a PMI value corresponding to at least three codebook indices of the codebook. The RF circuitry of the UE is configured to restrict the PMI feedback corresponding to a pre-coder associated with the at least one bit. PMIs of the PMI feedback within the at least one of: the advanced CSI codebook or the NR codebook are based on a linear combination of DFT vectors. The associated RIs equal to two or higher (e.g., 3 through 8) in the at least one of: the advanced CSI codebook or the NR codebook, co-phasing coefficients, or power coefficients between different layers or streams of data transmission can be different from one another.

The UE can restrict one or more beam directions indicated by the codebook subset restriction within a beam group of a plurality of beam groups based on a selected beam group as indicated in the CSI report configuration reporting settings. The UE can then reduce a power overhead granularity from a plurality of different maximum beam power levels and restrict one or more beams, based on a value of a bit pair within the bitmap that corresponds with a beam group of the plurality of beam groups.

NR Type II Codebook:

Beamforming vectors for PMI in Type II codebook are represented as linear combination of L∈(2, 3, 4) mutually orthogonal vectors $v_{l,m}$ (see, eqn 3) with indexes {(l1,m1), (l2,m2), ..., (lL, lL)}. Each vector in that linear combination is weighted by quantized values: real value that is reported for wideband (wideband beam power), real value that is reported for each sub-band (sub-band beam power), and complex value which amplitude is set to 1 (beam phase). Resulting direction of such beamforming vector is determined by all the components: coefficients and beams.

Codebook Subset Restriction for Type II:

In one embodiment UE is configured with single bitmap A (defined codebook subset restriction parameter) by higher layer signaling. Each bit $a_{l,m}$ within bitmap A can correspond to 2D DFT vectors $v_{l,m}$ (see, eqn 3). If bit $a_{l,m}$ is set to zero, then PMI that is comprised from $v_{l,m}$ with any coefficients is restricted for reporting. In another embodiment, UE 101/102/400 is configured with two bitmaps A and O by high layer signaling. Each bit $a_K$ within bitmap A corresponds to 2D DFT vectors $v_K$. Each bit $o_K$ within bitmap O corresponds to 2D DFT vectors $v_K$. If bit $a_K$ is set to zero and $o_K$ is set to one, then PMI that is comprised from $v_K$, which wideband beam power coefficient is lower than specific value $P_T$, is restricted for reporting. If bit $a_K$ is set to one and $o_K$ is set to zero, then PMI that is comprised from $v_K$, which wideband beam power coefficient is higher than specific value $P_T$, is restricted for reporting. If bit $a_K$ is set to zero and $o_K$ is set to zero, then PMI that is comprised from $v_K$ is restricted for reporting.

NR Type I Multi-Panel Codebook:

Type I multi-panel codebook is an extension of Type I single-panel by adding inter-panel co-phasing. It has the following configuration parameters: Ng, N1, N2, O1, O2, Mode, where Ng corresponds to the number of panels at the gNB, Mode can take two values: 'Mode 1' or 'Mode 2'. Mode 2 is defined only for Ng=2. For reference, example of PMI structure for Rank 1 Type I multi-panel codebook for Ng=2 Mode 1 (6) and Mode 2 (7) are represented below.

$$W^{(1)}_{l,m,n,i} = \frac{1}{\sqrt{P}} \begin{bmatrix} v_{l,m} \\ a_i v_{l,m} \\ \varphi_n v_{l,m} \\ a_i \varphi_n v_{l,m} \end{bmatrix}; \quad (6)$$

$$W^{(1)}_{l,m,n,k_1,i_2,j_1,j_2} = \frac{1}{\sqrt{P}} \begin{bmatrix} v_{l,m} \\ a_{i_1} b_{j_1} v_{l,m} \\ c_n v_{l,m} \\ a_{i_2} b_{j_2} v_{l,m} \end{bmatrix}, \quad (7)$$

Referring to the above, $a_i$ and $b_k$, $c_n$ are inter-panel co-phasing factors. Since the direction of the transmission is defined either by vector $v_{l,m}$ and value of inter-panel co-phasing, the beamforming vector $f_{l,m,d}$ in this case can be defined as follows: $f_{l,m,d} = [v=_{l,m}{}^T z_d v_{l,m}{}^T]^T$. It can be seen from (6), that rank 1 Mode 1 precoding matrix is comprised of single beamforming vector $f_{l,m,d}$ (8). In case of rank 1 Mode 2 precoding matrix is comprised of two beamforming vectors: $f_{l,m,d1}$, $f_{l,m,d2}$ (9).

$$W^{(1)}_{l,m,n,d} = \frac{1}{\sqrt{P}} \begin{bmatrix} f_{l,m,d} \\ \varphi_n f_{l,m,d} \end{bmatrix}; \quad (8)$$

$$W^{(1)}_{l,m,n,d_1,d_2} = \frac{1}{\sqrt{P}} \begin{bmatrix} f_{l,m,d1} \\ c_n f_{l,m,d2} \end{bmatrix}, \quad (9)$$

Codebook Subset Restriction for NR:

Considering similar PMI structure, for NR similar methodology for codebook subset restriction as for LTE-A FD-MIMO can be defined, where each bit within bitmap A (defined codebook subset restriction parameter) corresponds to $v_{l,m}$. However there are potential issues with this approach: 1. This approach cannot be applied for all ranks: since rank 3 and rank 4 codebooks for 16, 24 and 32 antenna ports at the gNB have different PMI structure comparing to other codebooks, aforementioned method for codebook subset restriction cannot be used for them; using bitmap A for Type II codebooks; and handling multi-panel co-phasing.

Codebook Subset Restriction for Type II:

In one embodiment, UE 101/102/400 is configured with single bitmap A by higher layer signaling. Each bit $a_{l,m}$ within bitmap A corresponds to 2D DFT vectors $v_{l,m}$ (3). If bit $a_{l,m}$ is set to zero, then PMI that is comprised from $v_{l,m}$ with any coefficients is restricted for reporting. In other embodiment, UE 101/102/400 is configured with two bitmaps A and O by high layer signaling. Each bit $a_K$ within bitmap A corresponds to 2D DFT vectors $v_K$. Each bit $o_K$ within bitmap O corresponds to 2D DFT vectors $v_K$. If bit $a_K$ is set to zero and $o_K$ is set to one, then PMI that is comprised from $v_K$, which wideband beam power coefficient is lower than specific value $P_T$, is restricted for reporting. If bit $a_K$ is set to one and $o_K$ is set to zero, then PMI that is comprised from $v_K$, which wideband beam power coefficient is higher than specific value $P_T$, is restricted for reporting. If bit $a_K$ is set to zero and $o_K$ is set to zero, then PMI that is comprised from $v_K$ is restricted for reporting.

Codebook subset restriction for Type I multi-panel: As it was noted above, the direction of the transmission is defined either by vector $v_{l,m}$ and value of inter-panel co-phasing. The inter-panel co-phasing in case of Ng panels at the gNB is represented as vector $u_e$ with size Ng. Index e is changing in range in order to cover all possible inter-panel co-phasing combinations. In this case the beamforming vector $f_{l,m,e}$ is represented as Kronecker product of vector $v_{l,m}$ and vector $u_e$: $f_{l,m,e} = \text{kron}(u_e, v_{l,m})$.

In one embodiment for the purpose of codebook subset restriction, UE 101/102/400 is configured with bitmap Y by higher layer signaling. Each bit $y_{l,m,e}$ within bitmap Y corresponds to beamforming vector $f_{l,m,e}$. If bit $y_{l,m,e}$ is set to zero, then PMI that is comprised from $f_{l,m,e}$ is restricted for reporting.

In a first set of summary examples to the various aspects/embodiments above, the below examples are envisioned as herein below, as also described above.

For example, example 1 can be a method of codebook subset restriction. Example 2 can include the subject matter of Example 1, wherein user equipment (UE) is configured with channel state information (CSI) reporting settings. Example 3 can include the subject matter of any one of Examples 1-2, wherein CSI Type configured for CSI reporting settings is set to Type I. Example 4 can include the subject matter of any one of Examples 1-3, wherein UE is configured with first codebook. Example 5 can include the subject matter of any one of Examples 1-4, wherein codebook is set of precoding matrixes $C_1$. Example 6 can include the subject matter of any one of Examples 1-5, wherein subset of $C_1$ is comprised of precoding matrixes based on vector $v_K$. Example 7 can include the subject matter of any one of Examples 1-6, wherein subset of $C_1$ is denoted as $M_1$. Example 8 can include the subject matter of any one of Examples 1-7, wherein UE is configured with a second codebook. Example 9 can include the subject matter of any one of Examples 1-8, wherein codebook is set of precoding matrixes $C_2$. Example 10 can include the subject matter of any one of Examples 1-9, wherein subset of $C_2$ is comprised of precoding matrixes based on vector $h_J$. Example 11 can include the subject matter of any one of Examples 1-10, wherein subset of $C_2$ is denoted as $M_2$. Example 12 can include the subject matter of any one of Examples 1-11, wherein UE is configured with bitmap A (codebook subset restriction (parameter)). Example 12 can include the subject matter of any one of Examples 1-12, wherein bit within A is denoted as $a_K$, wherein if $a_K=0$ then reporting of precoding matrix from subset $M_1$ is restricted, wherein $a_K$ can be linked with vector $h_J$, wherein procedure is specified to determine if $a_K$ is linked with $h_J$. This can include two steps: first step is calculation of $Z_{K,J}=f(v_K, h_J)$; and the second step is comparing $Z_{K,J}$ with threshold T, wherein if $Z_{K,J}>T$, then $a_K$ is linked with $h_J$, wherein if $Z_{K,J}<T$, then $a_K$ is not linked with $h_J$. $Z_{K,J}=|v_K^H \cdot h_J|$ or $-\text{sum}(|v_K-h_J|^2)$, and wherein $T=v_K^H \cdot v_K$ or $-\text{sum}(|v_K-v_K|^2)$. If $a_K=0$ and $a_K$ is linked with $h_J$, then reporting of precoding matrix from subset $M_2$ is restricted.

Example 13 can include any one of Examples 1-2, wherein CSI Type configured for CSI reporting settings is set to Type II, and the UE is configured with codebook, wherein codebook is set of precoding matrixes C, wherein subset of C is comprised of precoding matrixes based on vector $v_K$. The subset can be denoted as M, wherein subset of M is comprised precoding matrixes based on vector $v_K$ weighted by wideband beam power coefficients, wherein all wideband beam power coefficients $>P_T$, wherein the subset can be denoted as $M_1$ and all wideband beam power coefficients $<P_T$ The subset is denoted as $M_2$.

Example 14 can include Examples 1-2 where the UE can also configured with two bitmaps A and O as Type II for CSI reporting settings having a setting indicating the CSI type as Type II. The bit within A is denoted as $a_K$, wherein bit within O is denoted as $o_K$, wherein if $a_K=0$ and $o_K=0$ then reporting of precoding matrix from subset M is restricted. If $a_K=1$ and $o_K=0$, then reporting of precoding matrix from subset $M_1$ is restricted. If $a_K=0$ and $o_K=1$, then reporting of precoding matrix from subset $M_2$ is restricted. $P_T$ is configured by high layer signaling or fixed in the specification.

Example 14 can include Examples 1-3, wherein the UE is configured a codebook, wherein the codebook is a set of precoding matrixes C and wherein subset of C is comprised of precoding matrixes based on vector $v_K$ and inter-panel co-phasing vector $u_E$, wherein subset of C is denoted as M, wherein UE is configured with bitmap A, wherein a bit within A is denoted as $a_{KE}$, and wherein if $a_{KE}=0$ then reporting of precoding matrix from subset M is restricted.

Example 15 an include Example 5, wherein subset of $C_1$ is comprised of precoding matrixes based on vector $v_{2g,m}$, wherein the subset of $C_1$ is denoted as $M_1$, wherein subset of $C_2$ is comprised of precoding matrixes based on vector $h_{g,m,k}$, and wherein k=0, 1, 2, 3. A subset of $C_2$ can be denoted as $M_2$, wherein a bit within A is denoted as $a_{l,m}$, wherein if $a_{2g,m}=0$ then reporting of precoding matrix from subset $M_1$ is restricted, wherein if $a_{2g,m}=0$ then reporting of precoding matrix from subset $M_2$ is restricted; wherein reporting of precoding matrix from subset $M_2$ can be restricted or not restricted based on bits $a_{mod(2g-1,N1 \cdot O1),m}$; $a_{2g,m}$; $a_{mod(2g+1,N1 \cdot O1),m}$. If at least one bit is set to zero reporting of precoding matrix from subset $M_2$ is restricted. The reporting of precoding matrix from subset $M_2$ can be restricted or not restricted based on bits $a_{2g,m}$; $a_{mod(2g+1,N1 \cdot O1),m}$. If at least one bit is set to zero reporting of precoding matrix from subset $M_2$ is restricted. UE can be configured with second bitmap P, wherein bit within P is denoted as $p_k$, wherein g=0, 1, . . . , ((N1/2)O1−1) and m=0, 1, . . . , (N2O2−1), and wherein if $p_k=0$ then reporting of precoding matrix from subset $M_2$ is restricted.

5G NR/Advanced LTE Codebooks:

5G NR specification supports different codebook types defined by CodebookType parameter within CodebookConfig. CodebookType parameter takes the following values corresponding to different codebook types: a. TypeI-SinglePanel (Type I SP)—codebook with normal spatial resolution for single panel antenna configuration at the gNB; b. TypeI-MultiPanel (Type I MP)-codebook with normal spatial resolution for multi-panel antenna configuration at the gNB; c. Type II (Type II)—codebook with higher spatial resolution; d. Type II-PortSelection (Type II PS)—codebook with higher spatial resolution optimized for precoded (beamformed) CSI-RS; or e. Type I-PortSelection (Type I PS)-codebook with normal spatial resolution optimized for precoded (beamformed) CSI-RS.

Codebook Subset Restriction for 5G NR/Advanced LTE Codebooks:

The main focus here is: codebook subset restriction for Type II codebooks for Rank (RI) 3-8, and rank (RI) restriction for all 5G NR codebooks. Since Type II codebooks are defined for up to rank 2, the throughputs of the UEs (e.g., 101, 102, 400, or the like)) configured with Type II codebook is limited. In order to solve this issue and improve the maximum UE 101, 102, 400 throughput in this case, Type I rank 3-4 codebooks can be used for rank 3-8 CSI reporting for the UEs configured with Type II codebooks.

Details of Type II/Advanced LTE Codebooks:

In order to describe the design of codebook subset restriction feature, the details of Type II 5G NR codebooks are presented in this section to increase spatial resolution for PMI feedback PMI (precoding matrix) within Type II codebook is represented as linear combination of DFT vectors (beams) $v_{l,m}$.

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases} \quad (10)$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The column of precoding matrix (PMI) for Type II codebook is represented below.

$$W^l_{q_1,q_2,n_1,n_2,p^{(1)}_l,p^{(2)}_l,c_l} = \frac{1}{\sqrt{N_1 N_2 \sum_{i=0}^{2L-1}(p^{(1)}_{l,i}p^{(2)}_{l,i})^2}} \begin{bmatrix} \sum_{i=0}^{L-1} v_{m^{(i)}_1,m^{(i)}_2} p^{(1)}_{l,i} p^{(2)}_{l,i} \varphi_{l,i} \\ \sum_{i=0}^{L-1} v_{m^{(i)}_1,m^{(i)}_2} p^{(1)}_{l,i+L} p^{(2)}_{l,i+L} \varphi_{l,i+L} \end{bmatrix}, \quad l=1,2 \quad (11)$$

The precoding matrix (PMI) for rank 1 Type II codebook is represented below.

$$W_{q_1,q_2,n_1,n_2,p_i^{(1)},p_i^{(2)},i_{2,1,1}}^{(1)} = W_{q_1,q_2,n_1,n_2,p_i^{(1)},p_i^{(2)},i_{2,1,1}}^1 \quad (12)$$

The precoding matrix (PMI) for rank 2 Type II codebook is represented below.

$$W^{(2)}_{q_1,q_2,n_1,n_2,p_1^{(1)},p_1^{(2)},i_{2,1,1},p_2^{(1)},p_2^{(2)},i_{2,1,2}} = \quad (13)$$

$$\frac{1}{\sqrt{2}}\left[ W^{1(}_{q_1,q_2,n_1,n_2,p_1^{(1)},p_1^{(2)},i_{2,1,1}} \quad W^2_{q_1,q_2,n_1,n_2,p_2^{(1)},p_2^{(2)},i_{2,1,2}} \right]$$

The main components of Type II precoding matrix are listed as follows: $v_{l,m}$—DFT beam (see (eqn 10)); $p_{p,i}^{(1)}$—wideband (WB) amplitude coefficient for p-th layer, $\lfloor i/2 \rfloor$ polarization and (i mod L), where L is maximum number of beams included in linear combination; $p_{p,i}^{(2)}$—subband (SB) amplitude coefficient for p-th layer, $\lfloor i/2 \rfloor$ polarization and (i mod L), where L is maximum number of beams included in linear combination; $\varphi_{p,i}$—phase coefficient for p-th layer, $\lfloor i/2 \rfloor$ polarization and (i mod L), where L is maximum number of beams included in linear combination.

Wideband (WB) amplitude coefficients take values represented in the table below.

TABLE 3

Mapping of elements of $i_{1,4,l}$: $k_{l,i}^{(1)}$ to $p_{l,i}^{(1)}$:

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

Details of Codebook Subset Restriction for Type II/Advanced LTE Codebooks:

Beamforming direction restriction for Type II codebook assumes DFT beam restriction based on OFT beam groups and defined as follows: —Partition $N_1N_2O_1O_2$ OFT beams into $O_1O_2$ beam groups $G(r_1,r_2)$ comprising $(N_1,N_2)$ adjacent beams $(r_1,r_2)$ is the bottom-left OFT beam of the group, $r_1 \in \{0, N_1, \ldots, (O_1-1)N_1\}$, $r_2 \in \{0, N_2, \ldots, (O_2-1)N_2\}$. The group is defined as: $G(r_1,r_2) = \{(r_1+x_1,r_2+x_2): x_1=0, 1, \ldots, N_1-1, x_2=0, 1, \ldots, N_2-1\}$. The codebook subset restriction (CBSR) is configured via $B_1$ and $B_2$, where $B_1$ is a $$\text{length-}\left\lceil \log_2\binom{O_1O_2}{P} \right\rceil$$

indicator which selects P beam groups $G(r_1r_2)$ for further restriction. P=4 beam groups are selected, and $B_2 = B^{(1)}B^{(2)}\ldots B^{(P)}$, where $B^{(i)}$ is a length-$2N_1N_2$ bitmap and restricts DFT beams and associated maximum WB amplitude coefficients in $G(r_1,r_2)$ for the i-th restricted $(r_1,r_2)$ value in $B_1$. For each of the $N_1N_2$ beams, a 2-bit indicator is used for amplitude restriction. The associated WB amplitude coefficients for each layer and polarization of a beam shall be at most the indicated $p_{MAX}$ value. Total length of $$B_1 \text{ and } B_2 = \left\lceil \log_2\binom{O_1O_2}{P} \right\rceil + 2PN_1N_2$$

TABLE 4

Max WB beam power $p_{MAX}$ for different values of bit pairs within $B^{(i)}$ bitmap:

| Value of bit pair | Max WB beam power $p_{MAX}$ |
|---|---|
| 00 | 0 |
| 01 | $\sqrt{0.25}$ |
| 10 | $\sqrt{0.5}$ |
| 11 | 1 |

The total size of bitmap for beamforming direction restriction for Type II or advanced LTE codebooks is $$\left\lceil \log_2\binom{O_1O_2}{4} \right\rceil + 8N_1N_2.$$

Various embodiments can include signaling of maximum possible value of rank for rank restriction; methods of codebook subset restriction for rank 3-8 codebooks using configuration for Type II codebooks; and reusing of bitmap defined for codebook subset restriction of rank 1-2 Type II codebooks for rank 3-8 codebooks. Advantages of these embodiments, include a reduced number of bits required for signaling of codebook subset restriction configuration.

Rank Restriction:

In one embodiment for the purpose of rank restriction, the UE 101, 102, 400 is configured with bitmap $A_1$ of length 8 where each bit corresponds to specific value of RI. In other embodiment for the purpose of rank restriction, the UE 101, 102, 400 is configured with bitmap $A_1$ of length min(8, N) where each bit corresponds to specific value of RI, where N is number of ports at the BS. In other embodiment for the purpose of rank restriction, UE 101, 102, 400 is configured with bitmap $A_1$ of length min(8, N, Nrx) where each bit corresponds to specific value of RI, where N is number of CSI-RS ports at the BS, Nrx—number of receive ports at the UE 101, 102, 400. If bit $a_j$ corresponding to RI=j within bitmap $A_1$ is set to zero, then RI=j is restricted for reporting.

In one embodiment for the purpose of rank restriction, UE 101, 102, 400 is configured with value RnkMax. RI values which exceeds RnkMax value are restricted for reporting.

Beamforming Direction Restriction for UE 101, 102, 400 Configured with Type II/Advanced LTE Codebooks:

Since Type II/advanced LTE codebooks are defined for up to rank 2, the throughputs of the UEs configured with Type II/advanced LTE codebook is limited. In order to solve this issue and improve the maximum UE throughput in this case, Type I rank 3-4 codebooks can be used for rank 3-8 CSI reporting for the UEs configured with Type II/advanced LTE codebooks.

In one embodiment for the purpose of codebook subset restriction for rank 3-8 codebooks, bitmap C of length N1N2O1O2 is configured in addition to bitmap B of length $$\left\lceil \log_2 \binom{O_1 O_2}{4} \right\rceil + 8N_1 N_2$$

for Type II/advanced LTE codebooks codebook subset restriction. In another embodiment for the purpose of codebook subset restriction for rank 3-8 codebooks, bitmap C of length (N1N2O1O2−4 N1N2) is configured in addition to bitmap B of length $$\left\lceil \log_2 \binom{O_1 O_2}{4} \right\rceil + 8N_1 N_2$$

for Type II/advanced LTE codebooks codebook subset restriction; bitmap B is partially reused for codebook subset restriction for rank 3-8 codebooks. If bit $c_{l,m}$ within bitmap C is set to zero, then PMIs based on quantity $v_{l,m}$ are restricted.

Figure 6:
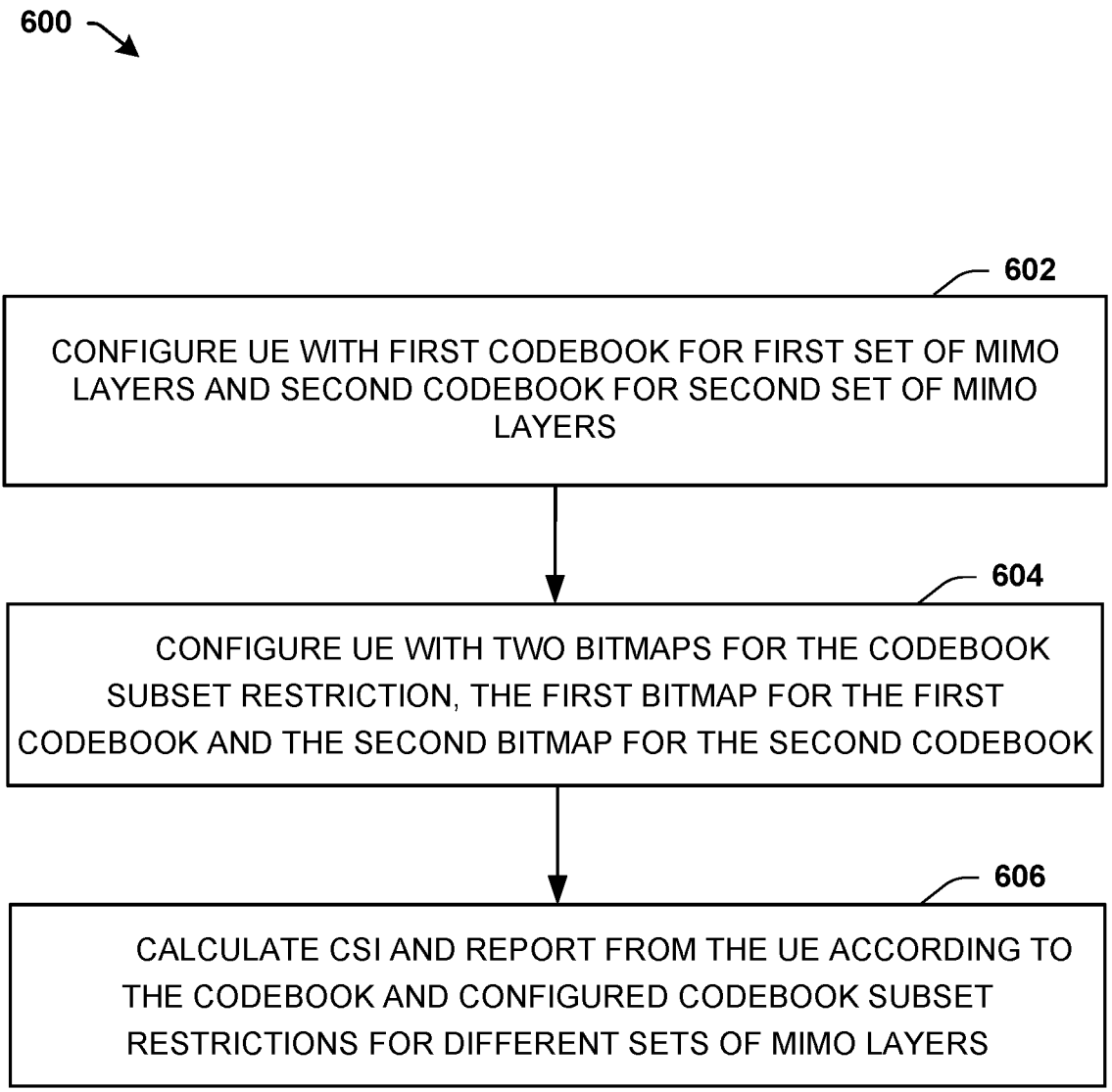
FIG. 6 illustrates a process flow of processing or generating a beam report and beam forming operations according to various aspects or embodiments described herein.

Referring to FIG. 6, illustrated is a process flow 600 for codebook subset restriction for beamforming with CSI feedback. At 602, the process flow 600 comprises configuring the UE 101, 102, 400 with a first codebook for a first set of MIMO layers and a second codebook for a second set of MIMO layers. At 604, the process flow 600 includes configuring the UE with two bitmaps for the codebook subset restriction, wherein the first bitmap is for the first codebook and the second bitmaps is for the second codebook. At 606, the process flow 600 includes calculating CSI and reporting CSI feedback according to the codebook and configured codebook subset restrictions for different sets of MIMO layers or streams equal to or less than the number of antennas in the devices antenna array or panel(s).

In another embodiment bitmap B of length $$\left\lceil \log_2 \binom{O_1 O_2}{4} \right\rceil + 8N_1 N_2$$

for Type II/advanced LTE codebooks codebook subset restriction is reused for rank 3-8 codebook subset restriction, which can correspond to restriction of beams (beam pairs) or beam vectors.

In one embodiment PMIs in rank 3-8 codebook based on OFT beam $v_{l,m}$ are restricted or not restricted for reporting depending on the values of bit pair for $v_{l,m}$ restriction within bitmap B of length $$\left\lceil \log_2 \binom{O_1 O_2}{4} \right\rceil + 8N_1 N_2$$

for Type II/advanced LTE codebooks codebook subset restriction.

Figure 7:
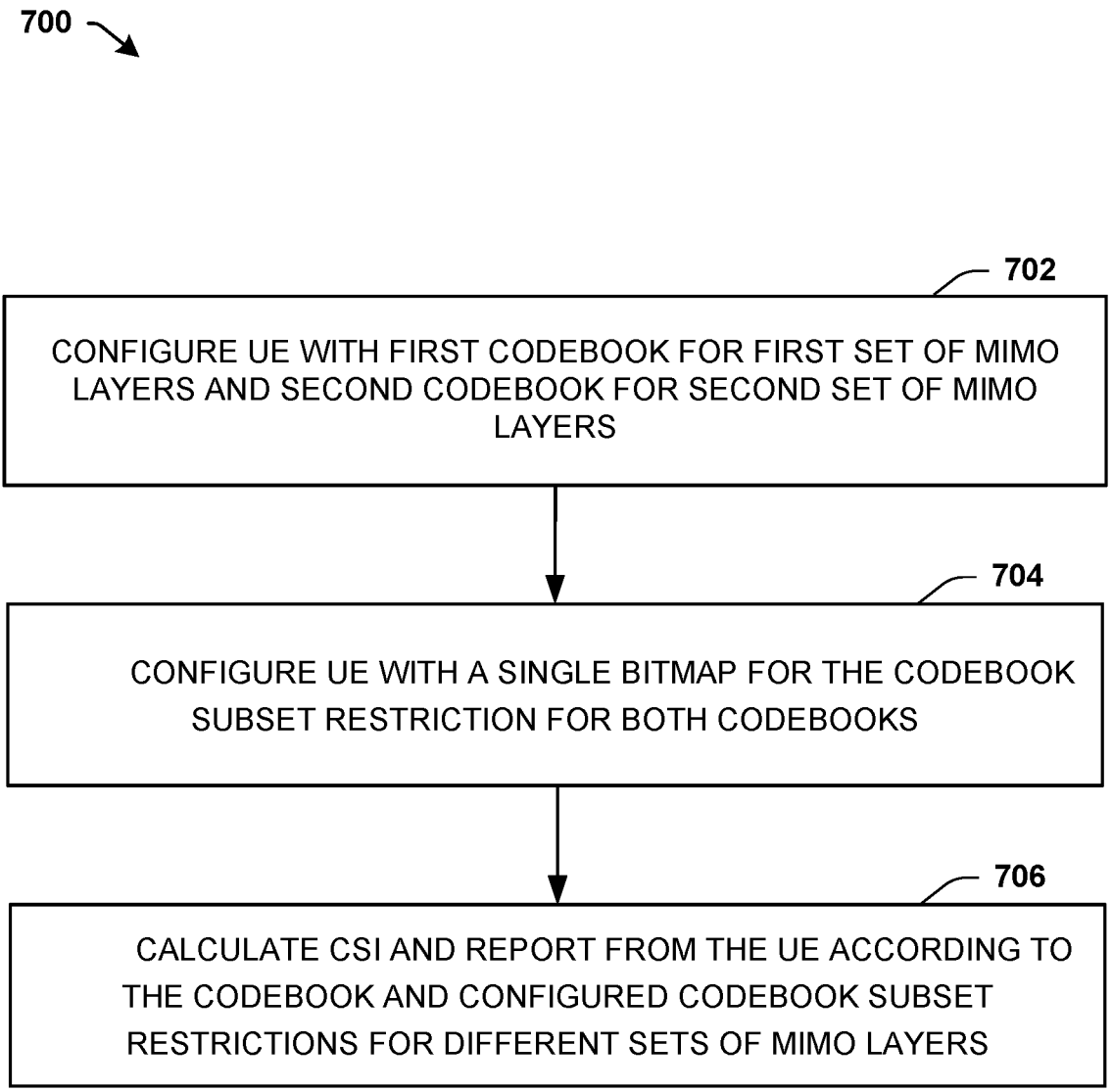
FIG. 7 illustrates another process flow of processing or generating a beam report and beam forming operations according to various aspects or embodiments described herein.

Referring to FIG. 7, illustrated is an example process flow 700 for configuring codebook subset restrictions for beams. At 702, the process flow 700 comprises configuring the UE 101, 102, 400 with a first codebook for a first set of MIMO layers and a second codebook for a second set of MIMO layers. At 704, the process flow 600 includes configuring the UE with a single bitmap for the codebook subset restriction for both of the codebooks. At 706, the process flow 700 includes calculating CSI and reporting CSI feedback according to the codebook and configured codebook subset restrictions for different sets of MIMO layers.

TABLE 5

Example of $vl_{,m}$ restriction rule for rank 3-8

| Value of bit pair | Is $v_{l,m}$ restricted |
|---|---|
| 00 | Yes |
| 01 | Yes |
| 10 | Yes |
| 11 | No |

TABLE 6

Example of $vl_{,m}$ restriction rule for rank 3-8

| Value of bit pair | Is $v_{l,m}$ restricted |
|---|---|
| 00 | Yes |
| 01 | Yes |
| 10 | No |
| 11 | No |

TABLE 7

Example of $vl_{,m}$ restriction rule for rank 3-8

| Value of bit pair | Is $v_{l,m}$ restricted |
|---|---|
| 00 | Yes |
| 01 | No |
| 10 | No |
| 11 | No |

In some examples, a method can include CSI reporting that includes linear discrete Fourier transformation (DFT) vectors combining codebook for the first set of MIMO layers and DFT based codebook for the second set of MIMO layers. The method includes configuration of the UE with the codebook subset restriction for the codebooks corresponding to the first set of supported MIMO layers and the second set of supported MIMO layers, and CSI calculation/reporting from the UE according to the codebook and configured codebook subset restrictions for different set of MIMO layers.

The first codebook subset restriction corresponds to bitmap restricting combinations of the DFT vectors and wideband amplitude combining coefficients and the second codebook subset restriction corresponds to the bitmap restricting DFT vectors only. The configuration can include a rank restriction, wherein rank restriction is bitmap A, each bit within bitmap A corresponds to a specific value of rank. The rank restriction can be a maximum value of rank available for CSI reporting. Here, the codebook subset restriction can be a bitmap common for the first codebook and the second codebook.

The restriction of DFT beam $v_{l,m}$ for second codebook can be determined based on bit pair used for restriction of combinations of DFT beam $v_{l,m}$ and different values of wideband amplitude combining coefficients. If at least one bit in the bit pair is set to zero, then DFT beam $v_{l,m}$ is restricted for reporting for second codebook. Alternatively, or additionally, if the first bit in the bit pair is set to zero, then DFT beam $v_{l,m}$ is restricted for reporting for second codebook. Alternatively, or additionally, if the second bit in the bit pair is set to zero, then DFT beam $v_{l,m}$ is restricted for reporting for second codebook. Alternatively, or additionally, if both bits within the bit pair are set to zero, then DFT beam $v_{l,m}$ is restricted for reporting for second codebook. The configuration can be performed using RRC signaling via the gNB 111/112/500.

Figure 8:
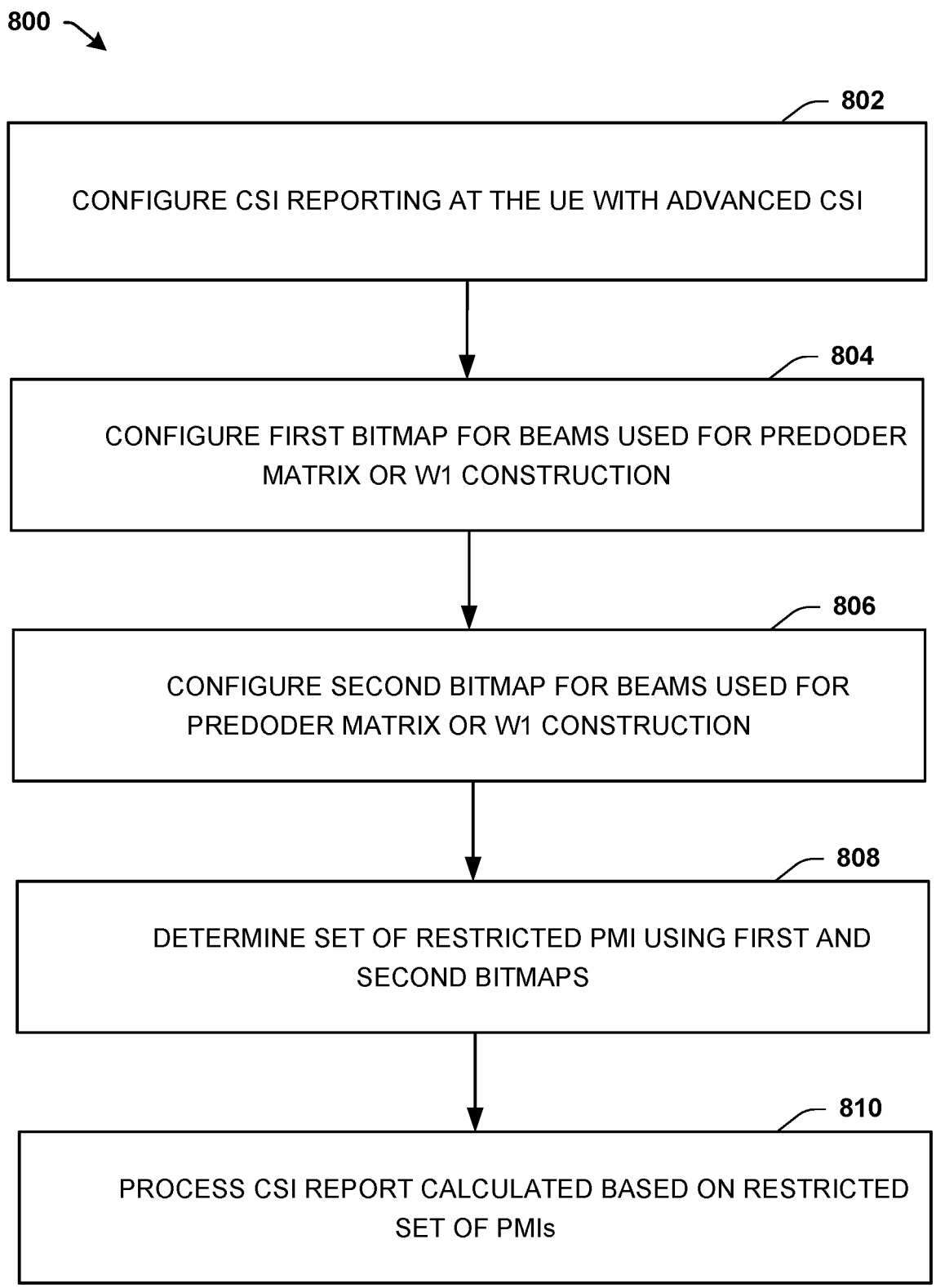
FIG. 8 illustrates a process flow of processing or generating a beam report and beam forming operations according to various aspects or embodiments described herein.

Referring to FIG. 8, illustrated is a process flow 800 of a CSI reporting procedure with proposed codebook subset restriction of PMI in an advanced CSI reporting mode.

Rel-8 specification defines codebook subset restriction parameter referred to as codebookSubsetRestriction. The codebookSubsetRestriction comprises a bitmap indicating the specific PMI(s) of different RI restricted at the UE from PMI reporting. A codebook subset restriction may be applied to different transmission modes including open-loop and closed-loop spatial multiplexing, multi-user MIMO and precoding for the closed-loop with an RI=1, see Table 1 below.

TABLE 8

Number of bits in codebook subset restriction bitmap for applicable transmission modes:

| | Number of bits $A_c$ | | |
|---|---|---|---|
| | 2 antenna ports | 4 antenna ports | 8 antenna ports |
| Transmission mode 3 | 2 | 4 | |
| Transmission mode 4 | 6 | 64 | |
| Transmission mode 5 | 4 | 16 | |
| Transmission mode 6 | 4 | 16 | |
| Transmission mode 8 | 6 | 64 with alternativeCodeBookEnabledFor4TX-r12=TRUE configured, otherwise 32 | |
| Transmission modes 9 and 10 | 6 | 96 with alternativeCodeBookEnabledFor4TX-r12=TRUE configured, otherwise 64 | 109 |

In Table 8, $A_c$ represents the number of bits included in codebookSubsetRestriction. PMI codebook subset restrictions in the LTE Rel-8/9 are defined for 2 and 4 antenna ports, where the size of a codebook is not very large. With 4 antenna ports, for example, the size of a codebook at each rank is 16 PMIs, and then 64 bits in total are required for a codebook subset restriction for all 4 supported ranks. However for 8Tx antenna, where dual-codebook feedback mechanism is assumed, another approach of the codebook subset restriction is used. More specifically, 8-antenna port codebook in the Rel-10 is represented as a two-dimension table where an index i1 corresponds to an index in the codebook C1 and is represented as a first PMI in a feedback and a column index i2 corresponds to an index in the codebook C2 and is represented as a second PMI in a feedback. The index i1 in the first codebook selects the set of the adjacent DFT beams for beamforming of antenna set with the same polarization and index i2 selects DFT beam in the DFT set and co-phasing coefficient for the combining of two DFT beamformed antennas groups with different polarizations. More specifically, a 8 antenna ports PMI is product of two matrices W1∈O1 and W2∈$C_2$, i.e. W=W1*W2.

The codebook subset restriction in 8Tx antenna instead of individual PMI restriction independently restricts the PMIs in the codebook C1 and C2, i.e. restricts set of DFT vectors and restricts the DFT beam selection and co-phasing. In order to reduce the signaling overhead the restriction of the DFT vector sets were assumed to be common for ranks {1, 2}, {3, 4}, {5, 6, 7} and {8}.

TABLE 9

Codebook subset restriction for 8 antenna ports:

| | Codebook size | | | | | | | | |
|---|---|---|---|---|---|---|---|---|---|
| Rank | 1 | 2 | 3 | 4 | 5 | 6 | 7 | 8 | Sum |
| $C_1$ | 16 | | 4 | | | 4 | | 1 | 25 |
| $C_2$ | 16 | 16 | 16 | 8 | 1 | 1 | 1 | — | 59 |
| Required bitmap size | | | | | | | | | 84 |

Rel-13/14 Class CSI Feedback:

In LTE Rel-13, two-stage codebook was extended to support two-dimension antenna port layouts, by constructing W1 by Kronecker product of two DFT vectors defining the beamforming for the two dimensional antenna array in the first and the second dimensions. The mechanism of codebook subset restriction was enhanced accordingly. Instead of explicitly indicating the allowed or restricted set of W1, Rel-13/14 codebook subsets are informed by a separate indication of beams, and ranks, except for W2 indication. For instance, bits $a_0$ thru (~) $a_{N_1O_1N_2O_2-1}$ are used to indicate the DFT beam restriction, while $a_{N_1O_1N_2O_2}$~$a_{N_1O_1N_2O_2+7}$ are used for rank indication. If PMI vector contains at least one restricted DFT beam indicated by bitmap, the corresponding PMI should be considered as restricted.

Rel-14 Advanced CSI:

In advanced CSI in LTE Rel-14, the precoding matrix can be also expressed as W=W1*W2, but with W1 containing two beams instead of one. More specifically $$W1 = \begin{bmatrix} b_{k_1} & p_1 b_{k_2} & 0 & 0 \\ 0 & 0 & b_{k_1} & p_1 b_{k_2} \end{bmatrix},$$

where $b_{k_1}$ and $b_{k_2}$ are orthogonal DFT based vectors which are denoted as 'strong' and 'weak beam' respectively and p1 is an inter beam power scaling value.

For the W1 structure above, the precoder matrices W2 are enhanced to support combining of the beam vectors in W1, which can be illustrated as bellow for the case of rank 1 and rank 2 respectively, $$W2 = \begin{bmatrix} 1 \\ c_{0,0,1} \\ c_{1,0,0} \\ c_{1,0,1} \end{bmatrix}$$

for rank1

$$W2 = \begin{bmatrix} 1 & 1 \\ c_{0,0,1} & c_{0,1,1} \\ c_{1,0,0} & c_{1,1,0} \\ c_{1,0,1} & c_{1,1,1} \end{bmatrix}$$

for rank2, where $c_{x,y,z}$ is a combining coefficient, which is complex value selected from some discrete set, e.g. from the QPSK alphabet.

For codebook subset restriction for advanced CSI, two bitmaps indicating a set of restricted beams for W1 corresponding to the 'strong' and 'weak' beams respectively can be defined by the gNB 111/112/500 for processing by the UE 101/102/400. This allows controlling beamforming selection at the UE for advanced CSI reporting by restricting certain undesired beam directions.

The UE 101/102/400 can be configured with advanced CSI reporting based on linear combining codebook will be also configured with at least two bitmaps indicating the set of restricted DFT beams for W1, where the first bitmap corresponds to set of strong beams and second bitmap to set of weak beams.

In particular, the first bitmap may contain bits denoted as $a_0^{(1)} \sim a_{N_1O_1N_2O_2-1}^{(1)}$ that defines the set of restricted/allowed strong DFT beams $b_{k_1}$ in W1 and the second bitmap may contain bits denoted as $a_0^{(2)} \sim a_{N_1O_1N_2O_2-1}^{(2)}$ that defines the set of restricted/allowed weak DFT beams in W1 $b_{k_2}$.

In one embodiment if at least one beam (either corresponding to strong or to weak beam) is restricted by the bitmap, the UE 101 102/500 processes the transmissions in way that PMI is constructed as $$W1 = \begin{bmatrix} b_{k_1} & p_1 b_{k_2} & 0 & 0 \\ 0 & 0 & b_{k_1} & p_1 b_{k_2} \end{bmatrix}$$

and containing restricted $b_{k_1}$ or $b_{k_2}$ should be considered as restricted.

Since the linear combination codebook in LTE is only used for low rank transmission (e.g. rank 1 and rank 2 CSI report), while conventional codebook for higher rank transmission, UE 101/102/400 can utilize one bitmap (either corresponding to the strong beam or weak beams) to determine the restricted set of PMIs for higher rank (e.g. rank 3 and above).

In another embodiment, UE 101/102/400 may be configured with third bitmap indicating set of restricted beams for rank 3 and above.

In another embodiment, in addition to the bitmaps restricting DFT beams $b_{k_1}$ or $b_{k_2}$, UE 101/102/400 may be also configured with the bitmap restricting PMI reporting for certain rank. In particular UE may receive bitmap of length 8, where each bit corresponds to the specific rank.

In another embodiment, UE 101/102/400 may be configured with bitmap restricting use of the power offset values p1 for W1 construction.

In another embodiment, for high band, UE 101/102/400 may use multiple antenna panels for DL reception, and it can use multiple antenna panels to receive one or more DL beams originating from one or multiple TRPs or gNB 500s. UE 101/102/400 may be configured with a restriction bitmap restricting the UE antenna port (APs) group(s) or antenna panels are used to measure the CSI. For example, if the TRP (or gNB 500) to use multi-TRP and multi-panel operation, it can require the UE to report the CSI based on 1 APs group. In another example, if the TRP utilizes a single beam, which is jointly received by multiple panels, it can require the CSI measured from all APs groups by signaling as such.

The process flow 800 of codebook subset restriction can be performed at the UE 101/102/400, and enabled by the gNB 500, for advanced CSI reporting based on linear beam combining codebook. At 802, the process flow 800 includes configuring advanced channel state information (CSI) reporting at the UE. At 804 and 806, a first and a second bitmap is configured for at least two beam (vector) restriction bitmaps at the UE corresponding to the set of beams used in a linear combination. At 808, the process flow 800 includes determining a set of restricted precoding matrix indices according to the set of beams derived from the configured bitmaps. At 810, the process flow includes calculation and reporting by the UE in accordance to the received CSI configuration and PMI restriction.

Each vector in the PMI is constructed by linear combination of the two or more beams for rank 1 and 2. PMI is considered as restricted if at least on vector in the linear combination is restricted by corresponding bitmap. Each vector in PMI can be constructed by one beam for rank 3 and above, wherein for rank 3 and above, UE derives the set of restricted PMIs by using one bitmap, e.g., corresponding to the first set of beams, and wherein for rank above 3, UE 101/102/400 is configured to use bitmap configured independently for bitmaps indicated for rank 1 and 2.

The UE 101/102/400 can thus also be configured with a rank restriction bitmap to restrict one or more RIs. The UE 101/102/400 is configured with linear combining coefficient bitmap restricting set of PMI containing that coefficient for this purpose.

Figure 9:
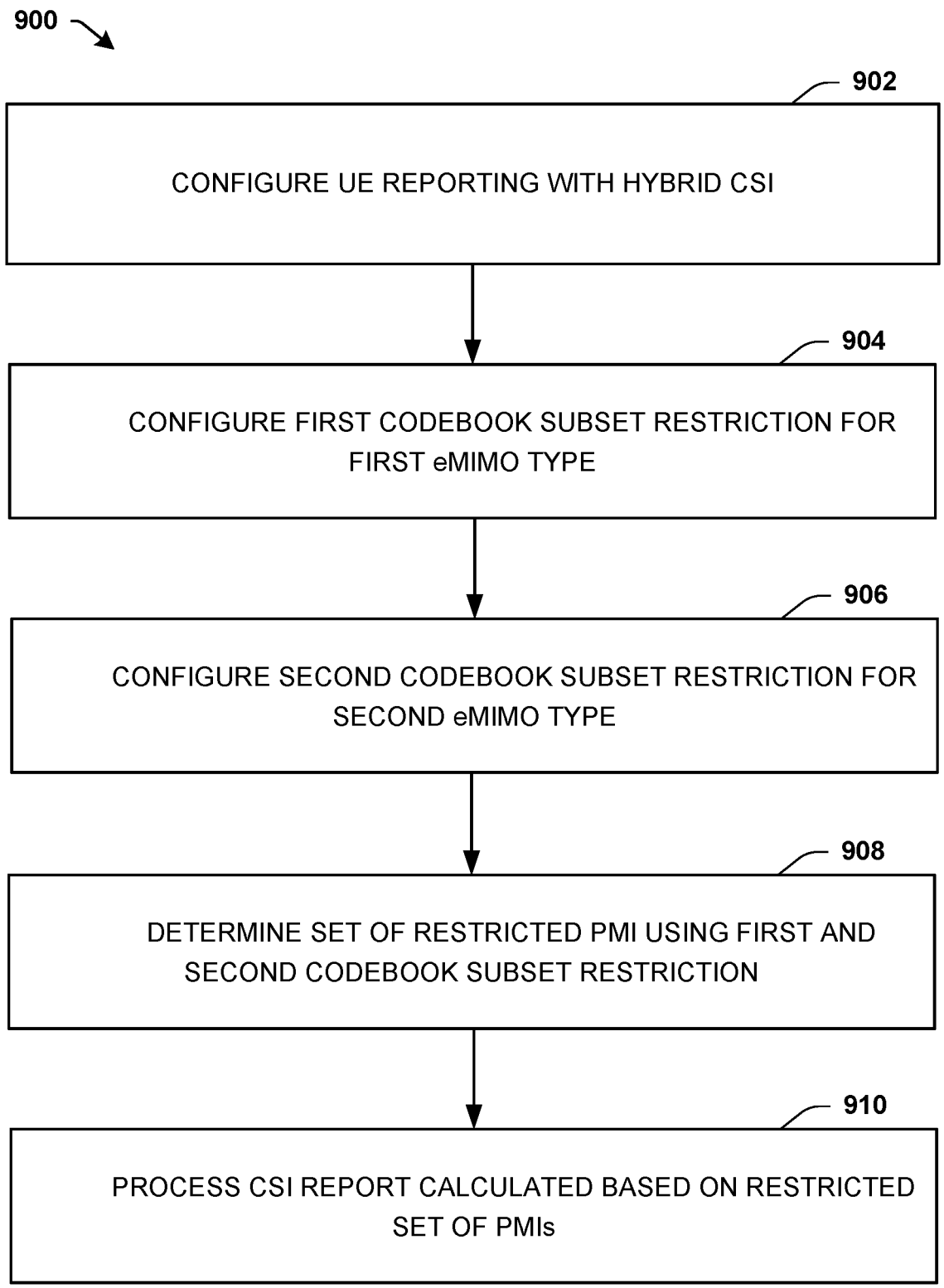
FIG. 9 illustrates another process flow of processing or generating a beam report and beam forming operations according to various aspects or embodiments described herein.

Referring to FIG. 9, illustrated is a process flow 900 of the CSI reporting procedure with proposed codebook subset restriction of PMI in advanced CSI reporting mode.

FD-MIMO:

In Rel-13 two classes of FD-MIMO schemes were specified—Class A and Class B. The CSI feedback in Class A FD-MIMO is derived using the channel measurement from the non-precoded CSI-RS with 8, 12, 16, 20, 24, 28 and 32 antenna ports and the configurable dual-codebook designed to support various 1D/2D antenna port layouts. The CSI feedback for Class B FD-MIMO is derived using the channel measurement from the beam formed CSI-RS with 1, 2, 4 and 8 antenna ports. The conventional Rel-12 codebooks, supporting 1D antenna port layouts, or the new Rel-13 beam selection codebooks can be used to calculate CSI feedback information for Class B FD-MIMO.

Comparing to Class A, the CSI-RS transmission for FD-MIMO with single CSI-RS resource (K=1) could be assisted by some additional information from the UE 101/102/400. More specifically, for Class B FD-MIMO at most eight CSI-RS antenna ports can be configured, limiting the maximum number of beams that can be used for the beam-formed CSI-RS transmission to four, in one aspect. To assist eNB/gNB 500 in the selection of the candidate beams for CSI-RS transmission, the legacy Rel-12 procedures can be used. For example, the reference signal received power (RSRP) measurements derived on the beamformed CSI-RS antenna ports can be exploited to identify the preferred beam set that should be used by the eNB 500 for CSI-RS transmission. Such RSRP measurements on CSI-RS can be realized using the existing Rel-12 DRS framework and, therefore, should be used for the comparison.

One of the solutions to enhance the existing scheme is to consider hybrid FD-MIMO operation with Class A and Class B FD-MIMO configured at the same time. In these schemes and according to an aspect, the beamformed CSI-RS Class B scheme is utilized in conjunction with non-precoded CSI-RS Class A scheme. In this case, beamforming applied by a serving eNB to generate beamformed CSI-RS can be derived based on CSI reporting from a UE based on Class A scheme. For example, Class A and Class B FD-MIMO may be configured for the UE 101/102/400. The PMI report provided for CSI process with Class A can be used to identify the candidate beams for CSI-RS transmission in Class B FD-MIMO. Due to reporting on the physical layer, the candidate beam information can be provided to the eNB 500 more dynamically comparing to RSRP reports in the legacy systems.

In an embodiment, codebook subset restriction can be generated for hybrid CSI includes signaling of the codebook subset restriction for the $1^{st}$ eMIMO type and $2^{nd}$ eMIMO type, where second enhanced MIMO (eMIMO) type corresponds to Class B FD-MIMO with K=1 and the first eMIMO type to: Class A FD-MIMO, or Class B FD-MIMO with K>1.

As such, codebook subset restriction (CBSR) for hybrid CSI can be configured at the UE with two CSI types.

When UE is configured with Class A eFD-MIMO for the $1^{st}$ eMIMO type, UE can be configured with bitmap $a_0 \sim a_{N_1 O_1 N_2 O_2 - 1}$ indicating the DFT beam restriction. In addition, UE can be configured with another bitmap indicating rank restriction of Class A feedback. Given that Class A FD-MIMO is supported for rank 1 and rank 3 only, the bitmap may include only two bits, where one bit corresponds to RI=1 and another bit to RI=3. In another embodiment, the rank restriction codebook has length of 8 bits and only two bits are used.

When UE 101/102/400 is configured with Class B eFD-MIMO with K>1 for the first eMIMO type, the UE can be configured with K bitmaps, where each bitmap corresponds to each k-th CSI-RS resource with structure (e.g. according to Table 9 above, or according to bitmap indicating DFT beam restriction). For both embodiments, the second eMIMO type corresponds to Class B FD-MIMO with K=1 and codebook subset restriction is bitmap, where each bit is associated with PMI of specific rank.

At 902, the process flow initiates for codebook subset restriction at the user equipment (UE) for hybrid CSI reporting with two CSI types by configuring hybrid channel state information (CSI) reporting at the UE. At 904 and 906, the process flow 900 comprises configuring two codebook subset restriction bitmaps at the UE corresponding to the 1st CSI and $2^{nd}$ CSI type. At 908, the process flow includes determining a set of restricted precoding matrix indices (PMI) according to the configured codebook restrictions, the first and second codebook subset restrictions. At 910, the process includes a calculation and reporting by the UE of CSI for each type in accordance to the received CSI configuration and PMI restriction.

The first CSI type is a non precoded or Class A. The first type is beamformed with multiple CSI-RS resources or Class B with K>1. The CSI type is beamformed with a single CSI-RS resource or Class B with K=1. The codebook subset restriction can be a bitmap restricting DFT beams in the first CSI type.

Additionally, or alternatively, the codebook subset restriction includes rank indicator restriction. For example, the rank restriction can use only two bits for rank restriction of the first CSI type.

The PMI is considered as restricted if at least one DFT vector is restricted by corresponding bitmap. The codebook subset restriction is a bitmap for each CSI-RS resource among K configured for the UE. The codebook subset restriction can also or alternatively be for each CSI-RS resource is bitmap restricting DFT beams. The codebook subset restriction can also be for each CSI-RS resource as a bitmap restricting PMI according to Table 2

Figure 10:
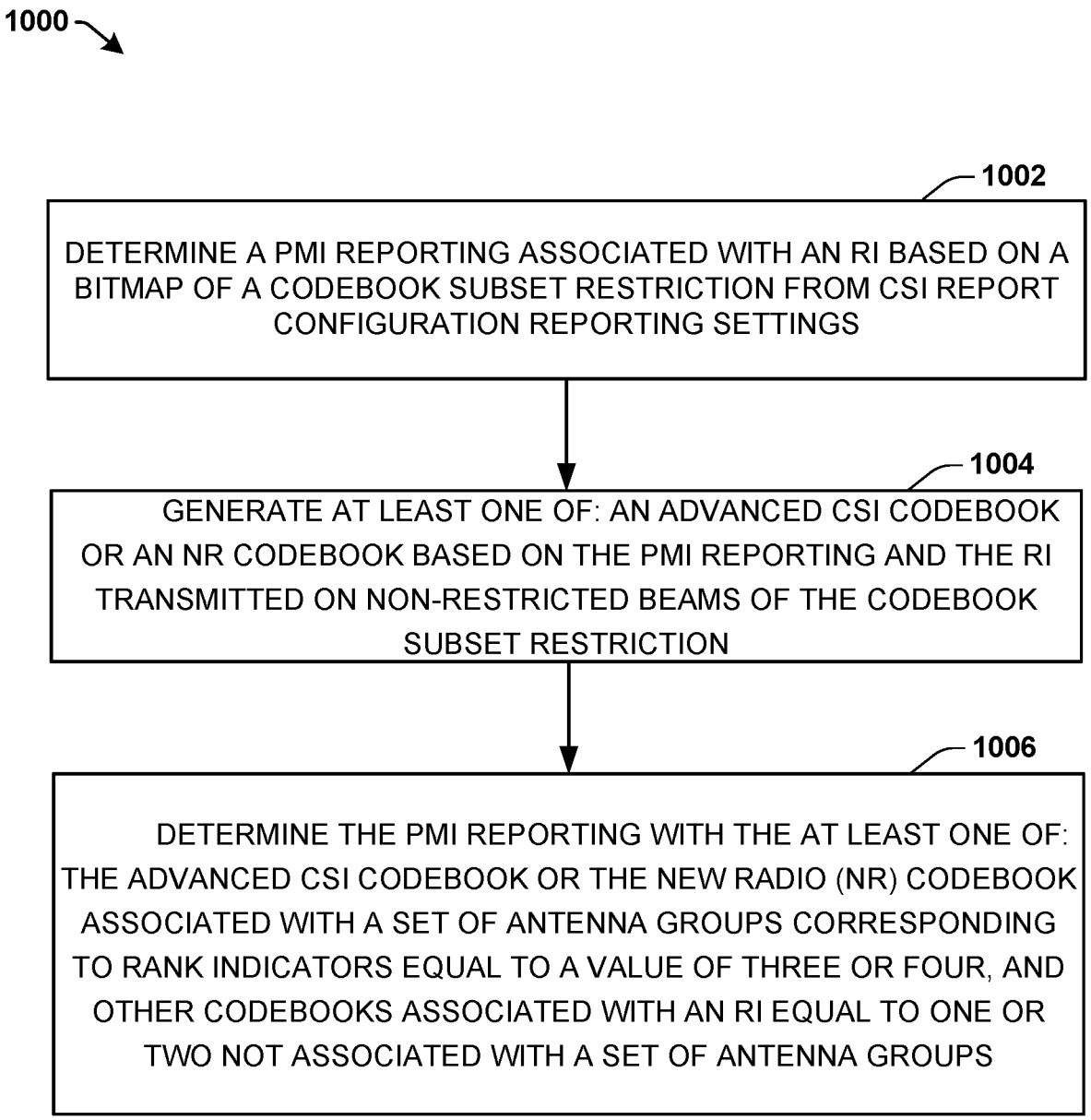
FIG. 10 illustrates a process flow of processing or generating a beam report and beam forming operations according to various aspects or embodiments described herein.

Referring to FIG. 10, illustrated is an example process flow 1000 for transmitting/receiving/processing/generating beam management procedure triggering and signaling with beam status reporting in accordance with the description herein. At 1002, a UE (e.g., UE 400) via one or more processors with a memory can determine a PMI reporting associated with a RI based on a bitmap of a codebook subset restriction from received CSI report configuration reporting settings. The bitmap comprises an indication of a set of PMIs restricted from the PMI reporting.

At 1004, the process flow 1000 includes generating at least one of: an advanced CSI codebook or a new radio (NR) codebook based on the PMI reporting and the RI to be transmitted on non-restricted beams of the codebook subset restriction.

At 1006, the process flow 1000, further includes determining the PMI reporting with the at least one of: the advanced CSI codebook or the new radio (NR) codebook associated with a set of antenna groupings corresponding to RIs equal to a value of three or four, and other codebooks associated with an RI equal to one or two not associated with an antenna grouping. The set of antenna groupings comprises a number of antenna ports comprising at least one of: 16, 24 or 32 antenna ports.

The operations or acts of the process flow 1000 can further include restricting the set of PMIs of the PMI reporting that is associated with a beam of a plurality of beams based on a configuration of one or more bits of the bitmap. RF circuitry is configured to transmit the PMI reporting on the plurality of beams that are non-restricted other than beams of a restricted PMI.

Other operations or acts of the process flow can include reusing the at least one of: the advanced CSI codebook or the NR codebook corresponding to a Type I codebook with rank 3 or 4 as the RI, as one or more Type II codebooks with ranks 3-8 for the PMI reporting with a beamforming restriction.

The UE 400, for example, can also operate by processing a first codebook of a first set of MIMO layers and a second codebook of a second set of MIMO layers. The bitmap can be derived as a first bitmap of the first codebook and a second bitmap of the second codebook from the codebook subset restriction by the reuse of the at least of: the advanced CSI codebook or the NR codebook, or the bitmap can be used as only one bitmap from the codebook subset restriction for both the first codebook and the second codebook. The UE 400 can further calculate and report CSI for the first set of MIMO layers and the second set of MIMO layers based on the at least one of: the advanced CSI codebook or the NR codebook, and the codebook subset restriction.

Figure 11:
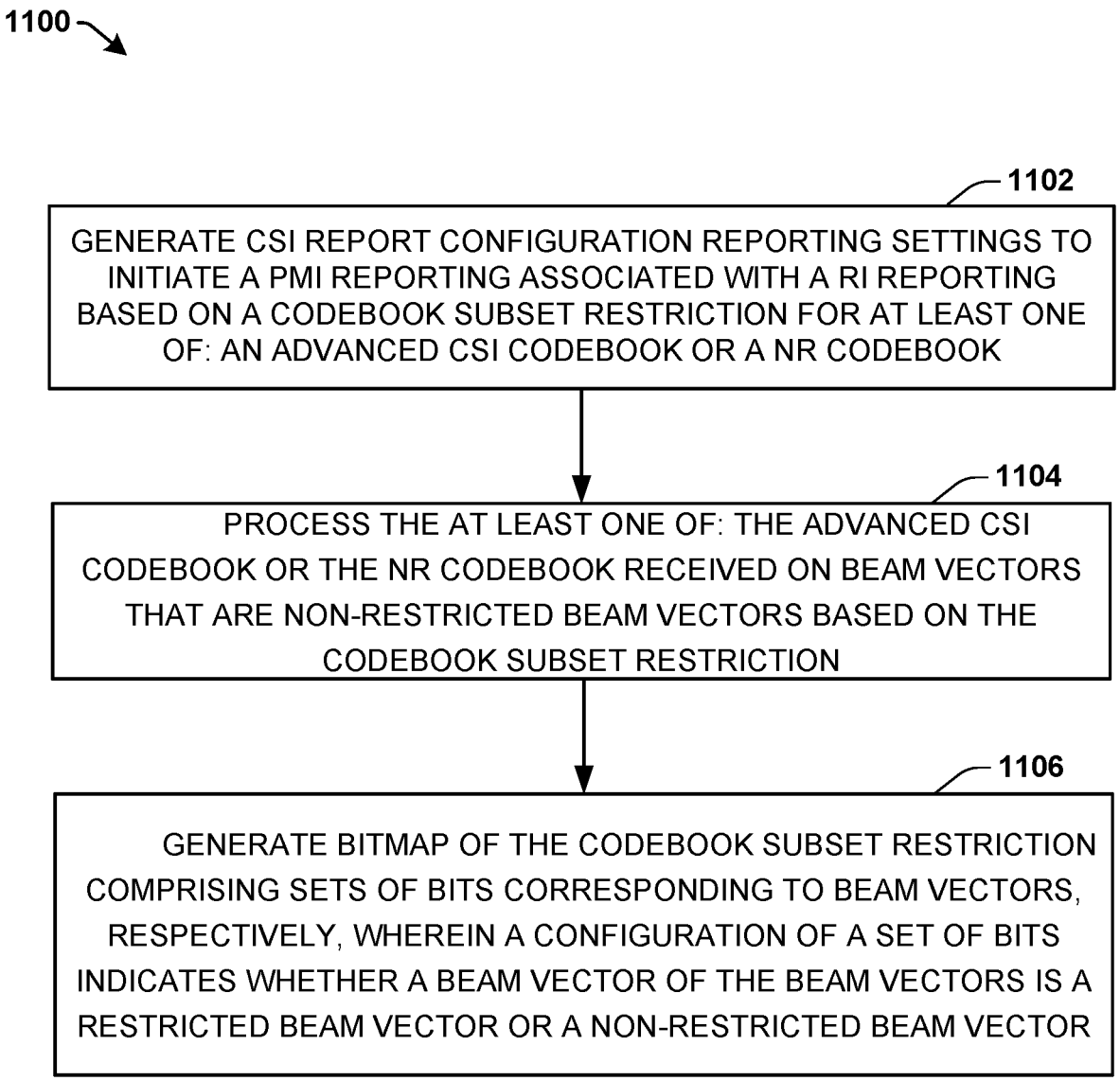
FIG. 11 illustrates another process flow of processing or generating a beam report and beam forming operations according to various aspects or embodiments described herein.

Referring to FIG. 11, illustrated is an example process flow 1100 for transmitting/receiving/processing/generating beam management and signaling with beam status reporting in accordance with the description herein.

At 1102, the process flow 1100 initiates with generating CSI report configuration reporting settings to initiate a pre-coding matrix indicator (PMI) reporting associated with a RI reporting based on a codebook subset restriction for at least one of: an advanced CSI codebook or a new radio NR codebook.

At 1104, the process flow includes processing the at least one of: the advanced CSI codebook or the NR codebook received on beam vectors that are non-restricted beam vectors based on the codebook subset restriction.

At 1104, the process flow further includes generating a bitmap of the codebook subset restriction comprising sets of bits corresponding to beam vectors, respectively, wherein a configuration of a set of bits indicates whether a beam vector of the beam vectors is a restricted beam vector or a non-restricted beam vector.

Operations or acts of the process flow 1100 can further include generating the CSI report configuration reporting settings with bitmaps corresponding to antenna groups comprising RIs equal to a value of three or four depending on an antenna grouping, and one or more other codebooks comprising non-antenna grouped codebooks with an RI equal to one or two not based on or with the antenna grouping, wherein the antenna groups comprise a number of antenna ports including at least one of: 16, 24 or 32 antenna ports.

The gNB 500 can further provide indications of the antenna groups differently from one another based on different orthogonal coefficients, wherein the at least one of: the advanced CSI codebook or the NR codebook that is associated with the antenna groups comprise one or more dimensions equal to a fraction of the one or more other codebooks.

The gNB 500 can indicate, via at least one bit of a set of bits having a zero value, a restriction of a co-phasing coefficient or a beam vector, wherein the set of bits is associated with a PMI value corresponding to at least three codebook indices of the codebook, and wherein the RF circuitry is configured to restrict the PMI feedback corresponding to a pre-coder associated with the at least one bit. For example, the gNB 500 can indicate a selected beam grouping of a plurality of beam groupings to enable a restriction of one or more beam directions within the selected beam grouping based on codebook subset restriction.

Figure 12:
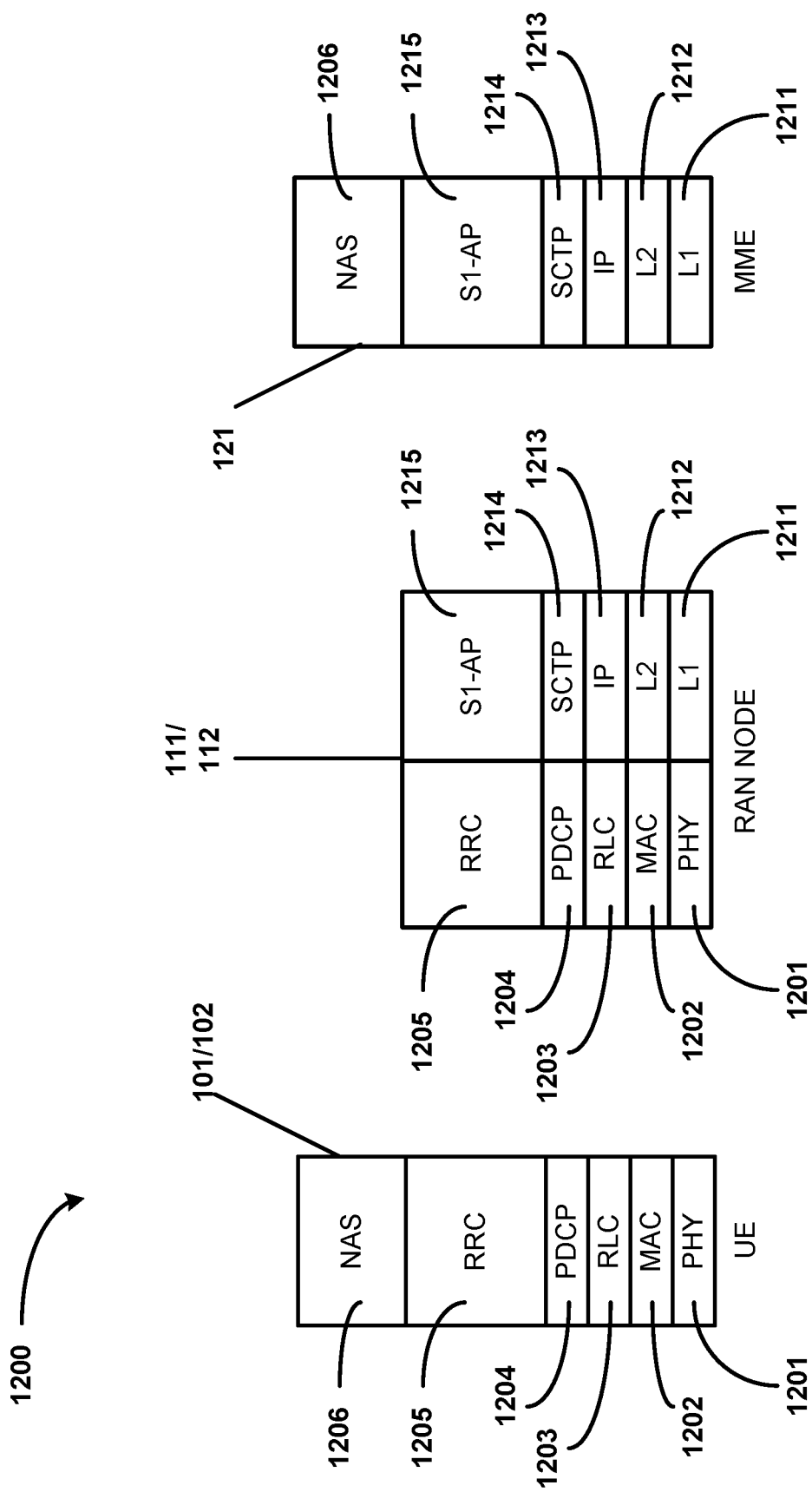
FIG. 12 illustrates a control plane protocol stack that can be implemented for operation of various embodiments and aspects described herein.

FIG. 12 is an illustration of a control plane protocol stack in accordance with various embodiments described herein. In this embodiment, a control plane 1200 is shown as a communications protocol stack between the UE 101 (or alternatively, the UE 102), the RAN node 111 (or alternatively, the RAN node 112), and the MME 121.

The PHY layer 1201 may transmit or receive information used by the MAC layer 1202 over one or more air interfaces. The PHY layer 1201 may further perform link adaptation or adaptive modulation and coding (AMC), power control, cell search (e.g., for initial synchronization and handover purposes), and other measurements used by higher layers, such as the RRC layer 1205. The PHY layer 1201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1203 may operate in a plurality of modes of operation, including: Transparent Mode (TM), Unacknowledged Mode (UM), and Acknowledged Mode (AM). The RLC layer 1203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1201, the MAC layer 1202, the RLC layer 1203, the PDCP layer 1204, and the RRC layer 1205.

The non-access stratum (NAS) protocols 1206 form the highest stratum of the control plane between the UE 101 and the MME 121. The NAS protocols 1206 support the mobility of the UE 101 and the session management procedures to establish and maintain IP connectivity between the UE 101 and the P-GW 123.

The S1 Application Protocol (S1-AP) layer 1215 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1214 may ensure reliable delivery of signaling messages between the RAN node 111 and the MME 121 based, in part, on the IP protocol, supported by the IP layer 1213. The L2 layer 1212 and the L1 layer 1211 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1211, the L2 layer 1212, the IP layer 1213, the SCTP layer 1214, and the S1-AP layer 1215.

Figure 13:
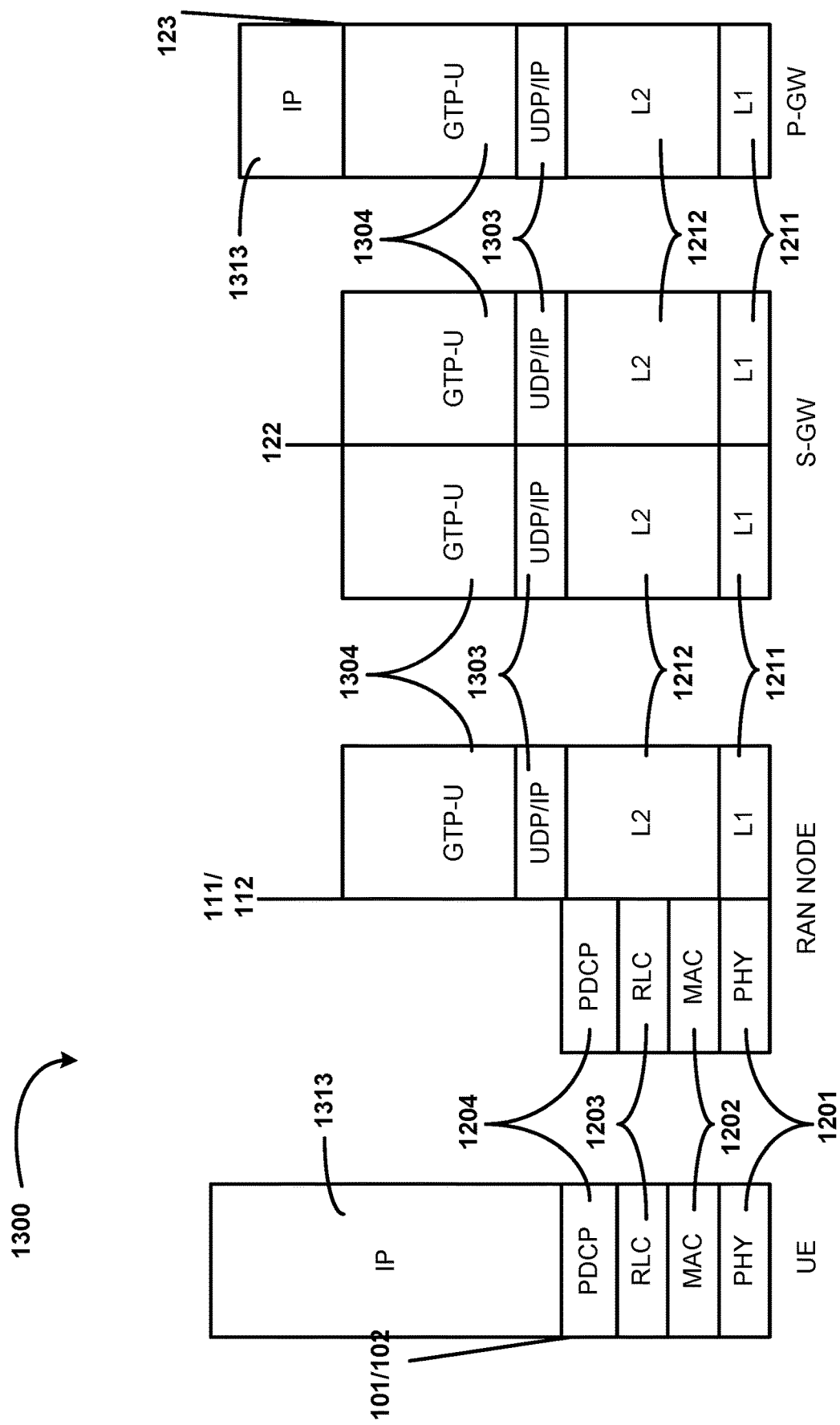
FIG. 13 illustrates user plane protocol stack that can be implemented for operation of various embodiments and aspects described herein.

FIG. 13 is an illustration of a user plane protocol stack in accordance with one or more embodiments herein. In this embodiment, a user plane 1300 is shown as a communications protocol stack between the UE 101 (or alternatively, the UE 102), the RAN node 111 (or alternatively, the RAN node 112), the S-GW 122, and the P-GW 123. The user plane 1300 may utilize at least some of the same protocol layers as the control plane 1200. For example, the UE 101 and the RAN node 111 may utilize a Uu interface (e.g., an LTE-Uu interface) to exchange user plane data via a protocol stack comprising the PHY layer 1201, the MAC layer 1202, the RLC layer 1203, the PDCP layer 1204.

The General Packet Radio Service (GPRS) Tunneling Protocol for the user plane (GTP-U) layer 1304 may be used for carrying user data within the GPRS core network and between the radio access network and the core network. The user data transported can be packets in any of IPv4, IPv6, or PPP formats, for example. The UDP and IP security (UDP/IP) layer 1303 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1211, the L2 layer 1212, the UDP/IP layer 1303, and the GTP-U layer 1304. The S-GW 122 and the P-GW 123 may utilize an S5/S8a interface to exchange user plane data via a protocol stack comprising the L1 layer 1211, the L2 layer 1212, the UDP/IP layer 1303, and the GTP-U layer 1304. As discussed above with respect to FIG. 12, NAS protocols support the mobility of the UE 101 and the session management procedures to establish and maintain IP connectivity between the UE 101 and the P-GW 123.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a user equipment (UE) comprising: a radio frequency (RF) interface configured to process, with RF circuitry, data of a transmission comprising channel state information (CSI) report configuration reporting settings to enable a pre-coding matrix indicator (PMI) feedback associated with a rank indicator (RI) feedback, based on a codebook subset restriction associated with at least one of: an advanced CSI codebook or a new radio (NR) codebook; and one or more processors, coupled to the RF interface, configured to: determine the PMI feedback associated with the RI feedback based on a bitmap of the codebook subset restriction from the processed transmission, wherein the bitmap comprises an indication of a set of PMIs restricted from the PMI feedback and the RI feedback; and generate the at least one of: the advanced CSI codebook or the NR codebook that is configured with the PMI feedback and the RI feedback to be transmitted on non-restricted beams of the codebook subset restriction.

Example 2 includes the subject matter of Example 1, wherein the bitmap comprises sets of bits corresponding to a plurality of beams in a plurality of dimensions, and wherein one or more bits of the sets of bits indicate a beam of the plurality of beams.

Example 3 includes the subject matter of any one of Examples 1-2, including or omitting any elements as optional, wherein the one or more processors are further configured to restrict at least one of: the PMI feedback or the RI feedback, associated with the beam of the plurality of beams, based on a configuration of the one or more bits, wherein the RF circuitry is further configured to transmit the PMI feedback and the RI feedback on the plurality of beams as non-restricted beams other than the restricted beam.

Example 4 includes the subject matter of any one of Examples 1-3, including or omitting any elements as optional, wherein the one or more processors are further configured to determine the PMI feedback and the RI feedback with the at least one of: the advanced CSI codebook or the new radio (NR) codebook, with one or more codebooks associated with one or more antenna groupings corresponding to RIs equal to a value of three or four, differently than from one or more other codebooks associated with an RI equal to one or two for non-grouped antennas, wherein the antenna groupings comprise a number of antenna ports comprising at least one of: 16, 24 or 32 antenna ports.

Example 5 includes the subject matter of any one of Examples 1-4, including or omitting any elements as optional, wherein the one or more bits restrict the plurality of beams within an antenna group as a subset of antennas of the antenna groupings, and wherein the one or more codebooks associated with the antenna groupings comprise one or more dimensions equal to a fraction of the one or more other codebooks.

Example 6 includes the subject matter of any one of Examples 1-5, including or omitting any elements as optional, wherein the one or more processors are further configured to: restrict a subset of the at least one of: the advanced CSI codebook or the NR codebook, comprising at least one of: a co-phasing vector or a Discrete Fourier Transform (DFT) beam vector of an associated beam, in response to at least one bit of a set of bits comprising a first configuration; and utilize for transmission as a non-restricted beam, the at least one of: the co-phasing vector or the DFT beam vector in response to the set of bits comprising a second configuration that is different from the first configuration.

Example 7 includes the subject matter of any one of Examples 1-6, including or omitting any elements as optional, wherein the at least one bit indicates an associated beam index of a plurality of indices to the associated beam among a plurality of beams of the codebook, and wherein the RF circuitry is further configured to transmit the codebook on the non-restricted beam while restricting beams associated with the subset of the codebook from transmission.

Example 8 includes the subject matter of any one of Examples 1-7, including or omitting any elements as optional, wherein the first configuration comprises the at least one bit being zero, wherein the set of bits is associated with a PMI value corresponding to at least three codebook indices of the codebook, and wherein the RF circuitry is configured to restrict the PMI feedback corresponding to a pre-coder associated with the at least one bit.

Example 9 includes the subject matter of any one of Examples 1-8, including or omitting any elements as optional, wherein PMIs of the PMI feedback within the at least one of: the advanced CSI codebook or the NR codebook are based on a linear combination of DFT vectors, and wherein associated RIs equal to two or higher in the at least one of: the advanced CSI codebook or the NR codebook, co-phasing coefficients, and power coefficients between different layers or streams of data transmission are different from one another.

Example 10 includes the subject matter of any one of Examples 1-9, including or omitting any elements as optional, wherein the one or more processors are further configured to: restrict one or more beam directions indicated by the codebook subset restriction within a beam group of a plurality of beam groups based on a selected beam group as indicated in the transmission.

Example 11 includes the subject matter of any one of Examples 1-10, including or omitting any elements as optional, wherein one or more processors are further configured to: reduce a power overhead granularity from a plurality of different maximum beam power levels and restrict one or more beams, based on a value of a bit pair within the bitmap that corresponds with a beam group of the plurality of beam groups.

Example 12 includes the subject matter of any one of Examples 1-11, including or omitting any elements as optional, wherein the one or more processors are further configured to: reuse the at least one of: the advanced CSI codebook or the NR codebook corresponding to a Type I codebook with rank 3 or 4 as the RI, as one or more Type II codebooks with ranks 3-8 for CSI reporting with a beamforming restriction.

Example 13 includes the subject matter of any one of Examples 1-12, including or omitting any elements as optional, wherein the one or more processors are further configured to: derive the bitmap as a first bitmap of a first codebook and a second bitmap of the second codebook from the codebook subset restriction by the reuse of the at least of: the advanced CSI codebook or the NR codebook, or by use of the bitmap as only one bitmap from the codebook subset restriction for both the first codebook and the second codebook; process a first codebook of a first set of multiple-input and multiple output (MIMO) layers and a second codebook of a second set of MIMO layers; and calculate and report CSI for the first set of MIMO layers and the second set of MIMO layers based on the first codebook and the second codebook, and the codebook subset restriction, wherein the first codebook and the second codebook respectively comprise the at least one of: the advanced CSI codebook or the NR codebook.

Example 14 includes the subject matter of any one of Examples 1-13, including or omitting any elements as optional, wherein the one or more processors are further configured to: configure a first codebook subset restriction bitmap and a second codebook subset restriction bitmap corresponding to a first CSI type and a second CSI type, respectively; determine one or more PMIs to be restricted based on the first codebook subset restriction bitmap and the second codebook subset restriction bitmap; and calculate and report a hybrid CSI based on the one or more restricted PMIs, wherein the first CSI type comprises a Class A full dimension (FD)-MIMO or a Class B FD-MIMO with K bitmaps, K being greater than one, and the second CSI type comprising a Class B FD-MIMO with K=1.

Example 15 is an apparatus configured to be employed in a next generation or new radio NodeB (gNB) device comprising: one or more processors configured to: generate channel state information (CSI) report configuration reporting settings to initiate a pre-coding matrix indicator (PMI) reporting associated with a rank indicator (RI) reporting based on a codebook subset restriction for at least one of: an advanced CSI codebook or a new radio (NR) codebook; and process the at least one of: the advanced CSI codebook or the NR codebook received on beam vectors that are non-restricted beam vectors based on the codebook subset restriction; a radio frequency (RF) interface, configured to provide, to RF circuitry, data for transmission related to the CSI report configuration reporting settings.

Example 16 includes the subject matter of Example 15, wherein the one or more processors are further configured to: generate bitmap of the codebook subset restriction comprising sets of bits corresponding to beam vectors, respectively, wherein a configuration of a set of bits indicates whether a beam vector of the beam vectors is a restricted beam vector or a non-restricted beam vector.

Example 17 includes the subject matter of any one of Examples 15-16, including or omitting any elements as optional, wherein the one or more processors are further configured to: generate the CSI report configuration reporting settings with bitmaps corresponding to antenna groups comprising RIs equal to a value of three or four depending on an antenna grouping, and one or more other codebooks comprising non-antenna grouped codebooks with an RI equal to one or two not based on or with the antenna grouping, wherein the antenna groups comprise a number of antenna ports including at least one of: 16, 24 or 32 antenna ports.

Example 18 includes the subject matter of any one of Examples 15-17, including or omitting any elements as optional, wherein the one or more processors are further configured to: provide indications of the antenna groups differently from one another based on different orthogonal coefficients, wherein the at least one of: the advanced CSI codebook or the NR codebook that is associated with the antenna groups comprise one or more dimensions equal to a fraction of the one or more other codebooks.

Example 19 includes the subject matter of any one of Examples 15-18, including or omitting any elements as optional, wherein the one or more processors are further configured to: indicate, via at least one bit of a set of bits having a zero value, a restriction of a co-phasing coefficient or a beam vector, wherein the set of bits is associated with a PMI value corresponding to at least three codebook indices of the codebook, and wherein the RF circuitry is configured to restrict the PMI feedback corresponding to a pre-coder associated with the at least one bit.

Example 20 includes the subject matter of any one of Examples 15-19, including or omitting any elements as optional, wherein the one or more processors are further configured to: indicate a selected beam grouping of a plurality of beam groupings to enable a restriction of one or more beam directions within the selected beam grouping based on codebook subset restriction.

Example 21 is a computer-readable storage medium storing executable instructions that, in response to execution, cause one or more processors of a user equipment (UE) to perform operations, comprising: determining a pre-coding matrix indicator (PMI) reporting associated with a rank indicator (RI) based on a bitmap of a codebook subset restriction from received channel state information (CSI) report configuration reporting settings, wherein the bitmap comprises an indication of a set of PMIs restricted from the PMI reporting; and generating at least one of: an advanced CSI codebook or a new radio (NR) codebook based on the PMI reporting and the RI to be transmitted on non-restricted beams of the codebook subset restriction.

Example 22 includes the subject matter of Example 21, wherein the operations further comprise: restricting the set of PMIs of the PMI reporting that is associated with a beam of a plurality of beams based on a configuration of one or more bits of the bitmap, wherein the RF circuitry is further configured to transmit the PMI reporting on the plurality of beams other than a beam or beam vector of a restricted PMI.

Example 23 includes the subject matter of any one of Examples 21-22, including or omitting any elements as optional, wherein the operations further comprise: determining the PMI reporting with the at least one of: the advanced CSI codebook or the new radio (NR) codebook associated with a set of antenna groupings corresponding to RIs equal to a value of three or four, and other codebooks associated with an RI equal to one or two not associated with antenna groupings, wherein the set of antenna groups comprises a number of antenna ports comprising at least one of: 16, 24 or 32 antenna ports.

Example 24 includes the subject matter of any one of Examples 21-23, including or omitting any elements as optional, wherein the operations further comprise: reusing the at least one of: the advanced CSI codebook or the NR codebook corresponding to a Type I codebook with rank 3 or 4 as the RI, as one or more Type II codebooks with ranks 3-8 for the PMI reporting with a beamforming restriction.

Example 25 includes the subject matter of any one of Examples 21-24, including or omitting any elements as optional, wherein the operations further comprise: processing a first codebook of a first set of multiple-input and multiple output (MIMO) layers and a second codebook of a second set of MIMO layers; deriving the bitmap as a first bitmap of the first codebook and a second bitmap of the second codebook from the codebook subset restriction by the reuse of the at least of: the advanced CSI codebook or the NR codebook, or use of the bitmap as only one bitmap from the codebook subset restriction for both the first codebook and the second codebook; and calculating and reporting CSI for the first set of MIMO layers and the second set of MIMO layers based on the at least one of: the advanced CSI codebook or the NR codebook, and the codebook subset restriction.

Example 26 can include an apparatus comprising means to perform one or more elements of a method described in or related to any of examples 1-26, or any other method or process described herein.

Example 27 can include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 can include an apparatus comprising logic, modules, or circuitry to perform one or more elements of a method described in or related to any of examples 1-25, or any other method or process described herein.

Example 29 can include a method, technique, or process as described in or related to any of examples 1-25, or portions or parts thereof.

Example 30 can include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 can include a method of communicating in a wireless network as shown and described herein.

Example 32 can include a system for providing wireless communication as shown and described herein.

Example 33 can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium.

In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a user equipment (UE) comprising:
one or more processors configured to:
receive a higher layer parameter for a codebook type;
receive a parameter of a bitmap for a codebook subset restriction of the codebook type;
generate a new radio (NR) codebook based on the parameter of the bitmap; and
restrict Precoder Matrix Indicator (PMI) reporting and Rank Indicator (RI) reporting that corresponds to any precoder that is associated with all layers of rank indicators, based on a configuration of a bit of the parameter of the bitmap or in response to a bit value of a bit of the parameter of the bitmap being zero; and
a radio frequency (RF) interface configured to process, with RF circuitry, data of a transmission based on the NR codebook.

2. The apparatus of claim 1, wherein the parameter of the bitmap comprises a sequence of bits.

3. The apparatus of claim 1, wherein the one or more processors are further configured to restrict reporting of a precoder matrix indicator (PMI) based on a bit value of the parameter of the bitmap.

4. The apparatus of claim 1, wherein the one or more processors are further configured to restrict reporting of a PMI that corresponds to a precoder associated with a bit in response to a bit value of the bit being zero.

5. The apparatus of claim 1, wherein the parameter of the bitmap comprises an indication of one or more PM's restricted from PMI reporting and Rank Indicator (RI) reporting as feedback.

6. The apparatus of claim 1, wherein the one or more processors are further configured to not allow PMI reporting to correspond to any precoder associated with a bit of the parameter of the bitmap where the bit value is zero.

7. The apparatus of claim 1, wherein the codebook type is set to a Type-1 Single Panel.

8. The apparatus of claim 1, wherein PM's of the PMI feedback within the at least one of: the advanced channel state information (CSI) codebook or the NR codebook are based on a linear combination of discrete Fourier transform (DFT) vector, and wherein associated RIs equal to two or higher in the at least one of: the advanced CSI codebook or the NR codebook, co-phasing coefficients, and power coefficients between different layers or streams of data transmission are different from one another.

9. An apparatus configured to be employed in a user equipment (UE) comprising:
one or more processors configured to:
receive a higher layer parameter for a codebook type;
receive a parameter of a bitmap for a codebook subset restriction of the codebook type;
generate a new radio (NR) codebook based on the parameter of the bitmap; and
restrict one or more beam directions indicated by the codebook subset restriction within a beam group of a plurality of beam groups based on a selected beam group as indicated in the transmission; and
a radio frequency (RF) interface configured to process, with RF circuitry, data of a transmission based on the NR codebook.

10. The apparatus of claim 9, wherein one or more processors are further configured to:
reduce a power overhead granularity from a plurality of different maximum beam power levels and restrict one or more beams, based on a value of a bit pair within the bitmap that corresponds with a beam group of the plurality of beam groups.

11. The apparatus of claim 10, wherein the one or more processors are further configured to:
reuse the at least one of: the advanced channel state information (CSI) codebook or the NR codebook corresponding to a Type I codebook with rank 3 or 4 as the Rank Indicator (RI), as one or more Type II codebooks with ranks 3-8 for CSI reporting with a beamforming restriction.

12. The apparatus of claim 11, wherein the one or more processors are further configured to:
derive the bitmap as a first bitmap of a first codebook and a second bitmap of the second codebook from the codebook subset restriction by the reuse of the at least of: the advanced CSI codebook or the NR codebook, or by use of the bitmap as only one bitmap from the codebook subset restriction for both the first codebook and the second codebook;

process a first codebook of a first set of multiple-input and multiple output (MIMO) layers and a second codebook of a second set of MIMO layers; and calculate and report CSI for the first set of MIMO layers and the second set of MIMO layers based on the first codebook and the second codebook, and the codebook subset restriction, wherein the first codebook and the second codebook respectively comprise the at least one of: the advanced CSI codebook or the NR codebook.

13. An apparatus configured to be employed in a user equipment (UE) comprising:
one or more processors configured to:
receive a higher layer parameter for a codebook type;
receive a parameter of a bitmap for a codebook subset restriction of the codebook type;
generate a new radio (NR) codebook based on the parameter of the bitmap;
configure a first codebook subset restriction bitmap and a second codebook subset restriction bitmap corresponding to a first channel state information (CSI) type and a second CSI type, respectively;
determine one or more Precoder Matrix Indicators (PMI(s)) to be restricted based on the first codebook subset restriction bitmap and the second codebook subset restriction bitmap; and
calculate and report a hybrid CSI based on the one or more restricted PMIs,
wherein the first CSI type comprises a Class A full dimension (FD)-MIMO or a Class B FD-MIMO with K bitmaps, K being greater than one, and the second CSI type comprising a Class B FD-MIMO with K=1; and
a radio frequency (RF) interface configured to process, with RF circuitry, data of a transmission based on the NR codebook.

14. An apparatus configured to be employed in a next generation or new radio NodeB (gNB) device comprising:
one or more processors configured to:
generate channel state information (CSI) report configuration reporting settings to initiate a pre-coding matrix indicator (PMI) reporting associated with a rank indicator (RI) reporting based on a codebook subset restriction for at least one of: an advanced CSI codebook or a new radio (NR) codebook;
process the at least one of: the advanced CSI codebook or the NR codebook received on beam vectors that are non-restricted beam vectors based on the codebook subset restriction; and
indicating, via at least one bit of a set of bits having a zero value, a restriction of a co-phasing coefficient or a beam vector, wherein the set of bits is associated with a PMI value corresponding to at least three codebook indices of the codebook, and wherein the RF circuitry is configured to restrict the PMI feedback corresponding to a pre-coder associated with the at least one bit;
a radio frequency (RF) interface, configured to provide, to RF circuitry, data for transmission related to the CSI report configuration reporting settings.

15. The apparatus of claim 14, wherein the one or more processors are further configured to:
generate the CSI report configuration reporting settings with bitmaps corresponding to antenna groups comprising RIs equal to a value of three or four depending on an antenna grouping, and one or more other codebooks comprising non-antenna grouped codebooks with an RI equal to one or two not based on or with the antenna grouping, wherein the antenna groups comprise a number of antenna ports including at least one of: 16, 24 or 32 antenna ports.

16. The apparatus of claim 15, wherein the one or more processors are further configured to:
provide indications of the antenna groups differently from one another based on different orthogonal coefficients, wherein the at least one of: the advanced CSI codebook or the NR codebook that is associated with the antenna groups comprise one or more dimensions equal to a fraction of the one or more other codebooks.

17. The apparatus of claim 14, wherein the one or more processors are further configured to:
indicating a selected beam grouping of a plurality of beam groupings to enable a restriction of one or more beam directions with the selected beam grouping based on codebook subset restriction.

18. An apparatus configured to be employed in a next generation or new radio NodeB (gNB) device comprising:
one or more processors configured to:
generate channel state information (CSI) report configuration reporting settings to initiate a pre-coding matrix indicator (PMI) reporting associated with a rank indicator (RI) reporting based on a codebook subset restriction for at least one of: an advanced CSI codebook or a new radio (NR) codebook;
process the at least one of: the advanced CSI codebook or the NR codebook received on beam vectors that are non-restricted beam vectors based on the codebook subset restriction; and
generate a bitmap of the codebook subset restriction comprising sets of bits corresponding to beam vectors, respectively, wherein a configuration of a set of bits indicates whether a beam vector of the beam vectors is a restricted beam vector or a non-restricted beam vector;
a radio frequency (RF) interface, configured to provide, to RF circuitry, data for transmission related to the CSI report configuration reporting settings.

19. A non-transitory computer-readable storage medium storing executable instructions that, in response to execution, cause one or more processors of a user equipment (UE) to perform operations, comprising:
determining a pre-coding matrix indicator (PMI) reporting associated with a rank indicator (RI) based on a bitmap of a codebook subset restriction from received channel state information (CSI) report configuration reporting settings, wherein the bitmap comprises an indication of a set of PM's restricted from the PMI reporting;
generating at least one of: an advanced CSI codebook or a new radio (NR) codebook based on the PMI reporting and the RI to be transmitted on non-restricted beams of the codebook subset restriction; and
restricting PMI reporting and RI reporting that corresponds to any precoder that is associated with all layers associated with rank indicators, based on a configuration of a bit of the parameter of the bitmap or in response to a bit value of a bit of the parameter of the bitmap being zero.

20. The non-transitory computer-readable storage medium of claim 19, wherein the operations further comprise:
restricting the set of PM's of the PMI reporting that is associated with a beam of a plurality of beams based on a configuration of one or more bits of the bitmap, wherein the RF circuitry is further configured to transmit the PMI reporting on the plurality of beams other than the beam of a restricted PMI.

21. The non-transitory computer-readable storage medium of claim 19, wherein the operations further comprise:
   determining the PMI reporting with the at least one of: the advanced CSI codebook or the new radio (NR) codebook associated with a set of antenna groups corresponding to RIs equal to a value of three or four, and other codebooks associated with RIs equal to one or two not associated with a set of antenna groups, wherein the set of antenna groups comprises a number of antenna ports comprising at least one of: 16, 24 or 32 antenna ports.

22. The non-transitory computer-readable storage medium of claim 19, wherein the operations further comprise:
   reusing the at least one of: the advanced CSI codebook or the NR codebook corresponding to a Type I codebook with rank 3 or 4 as the RI, as one or more Type II codebooks with ranks 3-8 for the PMI reporting with a beamforming restriction.

23. The non-transitory computer-readable storage medium of claim 19, wherein the operations further comprise:
   processing a first codebook of a first set of multiple-input and multiple output (MIMO) layers and a second codebook of a second set of MIMO layers;
   deriving the bitmap as a first bitmap of the first codebook and a second bitmap of the second codebook from the codebook subset restriction by the reuse of the at least one of: the advanced CSI codebook or the NR codebook, or use of the bitmap as only one bitmap from the codebook subset restriction for both the first codebook and the second codebook; and
   calculating and report CSI for the first set of MIMO layers and the second set of MIMO layers based on the at least one of: the advanced CSI codebook or the NR codebook, and the codebook subset restriction.

\* \* \* \* \*